(12) United States Patent
Matsuzaki et al.

(10) Patent No.: US 8,437,239 B2
(45) Date of Patent: May 7, 2013

(54) OPTICAL PICKUP, OPTICAL DISK DRIVE DEVICE, OPTICAL INFORMATION RECORDING DEVICE, AND OPTICAL INFORMATION REPRODUCTION DEVICE

(75) Inventors: Keiichi Matsuzaki, Kyoto (JP); Kousei Sano, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 13/521,549

(22) PCT Filed: Jan. 12, 2011

(86) PCT No.: PCT/JP2011/000089
§ 371 (c)(1),
(2), (4) Date: Jul. 11, 2012

(87) PCT Pub. No.: WO2011/086897
PCT Pub. Date: Jul. 21, 2011

(65) Prior Publication Data
US 2012/0294133 A1    Nov. 22, 2012

(30) Foreign Application Priority Data
Jan. 15, 2010   (JP) ................. 2010-006592

(51) Int. Cl.
*G11B 7/00*   (2006.01)
(52) U.S. Cl.
USPC ............ 369/112.24; 369/13.33; 369/94

(58) Field of Classification Search ............ None
See application file for complete search history.

(56) References Cited

U.S. PATENT DOCUMENTS

| | | |
|---|---|---|
| 7,414,947 B2 | 8/2008 | Saito et al. |
| 8,031,575 B2 | 10/2011 | Nakaoki et al. |
| 2007/0183298 A1 | 8/2007 | Saito et al. |
| 2007/0217300 A1 | 9/2007 | Koyama et al. |
| 2009/0219799 A1 | 9/2009 | Nakaoki et al. |
| 2011/0069599 A1* | 3/2011 | Narumi et al. ........... 369/112.23 |

FOREIGN PATENT DOCUMENTS

| | | |
|---|---|---|
| JP | 2007-250064 | 9/2007 |
| JP | 2007-250073 | 9/2007 |
| JP | 4228666 | 2/2009 |
| JP | 2010-33688 | 2/2010 |

OTHER PUBLICATIONS

International Search Report issued Feb. 8, 2011 in International (PCT) Application No. PCT/JP2011/000089.

\* cited by examiner

*Primary Examiner* — Wayne Young
*Assistant Examiner* — Brian Butcher
(74) *Attorney, Agent, or Firm* — Wenderoth, Lind & Ponack, L.L.P.

(57) ABSTRACT

An optical pickup, an optical disk drive device, an optical information recording device, and an optical information reproduction device in which a reproduction signal, a focus error signal, and a gap error signal can be detected with high accuracy when information is recorded/reproduced on/from an optical information medium having a plurality of information recording layers.

14 Claims, 13 Drawing Sheets

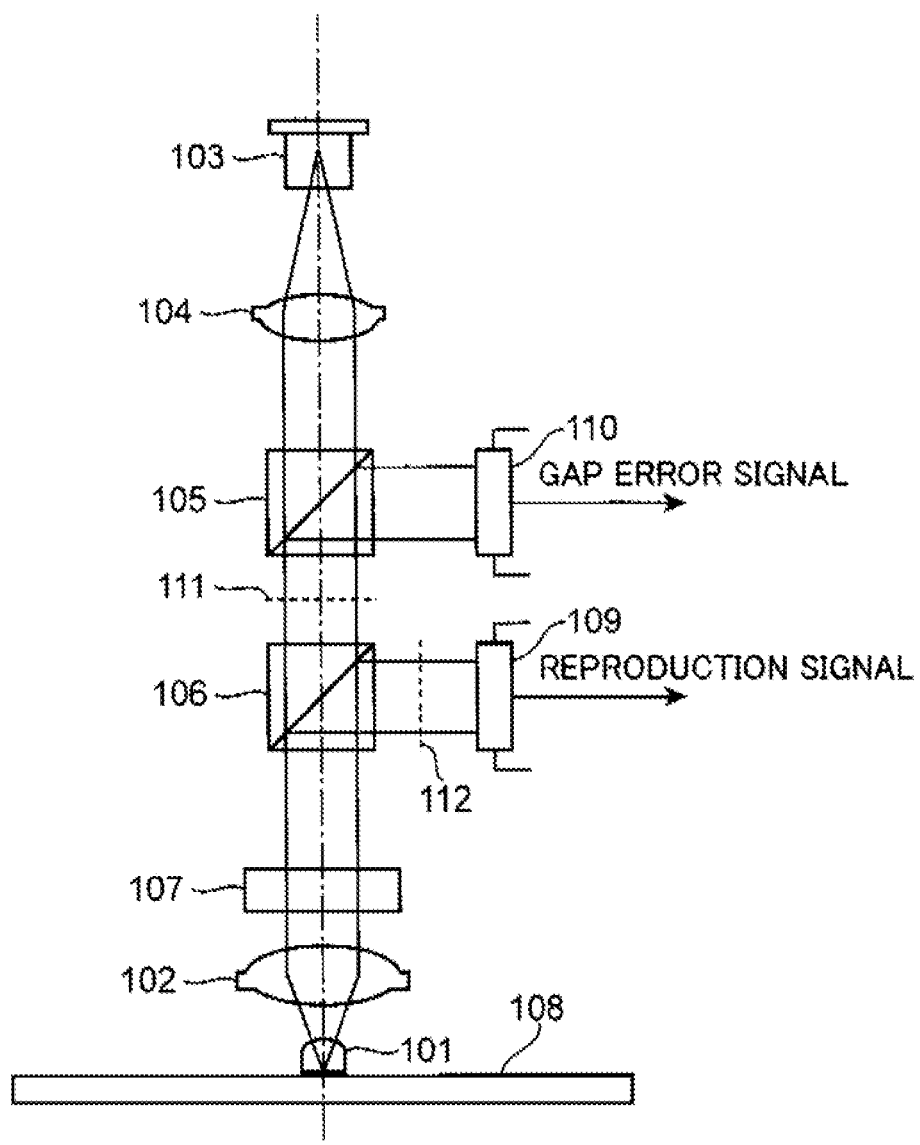

OPTICAL PICKUP, OPTICAL DISK DRIVE DEVICE, OPTICAL INFORMATION RECORDING DEVICE, AND OPTICAL INFORMATION REPRODUCTION DEVICE

TECHNICAL FIELD

The present invention relates to an optical pickup for recording/reproducing information on/from an optical information medium having a plurality of information recording layers, an optical disk drive device provided with the optical pickup, an optical information recording device provided with the optical disk drive device, and an optical information reproduction device provided with the optical disk drive device. The optical pickup includes a focusing lens group (7) that includes a solid immersion lens (8) and focuses the light; a first detection lens (11) that focuses the reflected light from an optical information medium (9) on a first detector (12), and a second detection lens (13) that focuses the reflected light from the flat surface portion of the solid immersion lens (8) on a second detector (14). The optical magnification ratio M of the first optical system including the focusing lens group (7) and the first detection lens (11) and the optical magnification ratio m of the second optical system including the focusing lens group (7) and the second detection lens (13) satisfy the condition M>m.

BACKGROUND ART

Following the spread of high-vision broadcasting and the development of techniques for recording/reproducing data, such as dynamic and static images, as digital information on/from a recording medium, BD (Blu-ray disc), which can record or reproduce larger volumes of information than the typical optical disks such as DVD and CD, have recently come into wide use.

In order to refine further the high-vision images and realize recording and reproduction of three-dimensional stereo images, optical information recording and reproduction systems are needed that can record and reproduce information in volumes even larger than those of BD.

In a typical optical recording/reproduction system that is presently used for optically recording and reproducing information signals on/from a recording medium, laser light for reproduction is focused on an optical disk, which is an optical recording medium and the reflected light therefrom is monitored to read the information signals that have been recorded on the optical disk.

Further, when information signals are recorded on an optical disk, or when the information signals recorded on the optical disk are deleted, the laser light for recording or laser light for deleting with a predetermined laser power is focused on a desirable position on the optical disk, the temperature of the region that is the object of recording or deletion on the information recording layer of the optical disk is raised due to irradiation with the laser light for recording or laser light for deletion, and the information signal is recorded or deleted.

In the conventional optical recording/reproduction technique, the density of data recorded on the optical disk depends on the spot diameter of laser light focused on the recording surface of the optical disk and data of higher density can be recorded or reproduced by decreasing the spot diameter of the laser light.

The minimum spot diameter of laser light focused by the objective lens is proportional to the laser light wavelength and inversely proportional to the numerical aperture of the objective lens. For this reason, the laser source wavelength is decreased and the numerical aperture of the objective lens is increased in order to increase the recording density by reducing the spot diameter of laser light.

Where the numerical aperture of the objective lens is denoted by NA, the angle of incidence of the focused light is denoted by θ, and the refractive index of the medium where the light is focused is denoted by n, the numerical aperture can be represented as NA=n×sin θ. This equation indicates that it is essentially impossible to increase the numerical aperture NA above 1 when the focusing path is provided in the air with a refractive index n of 1.

An optical pickup of a near-field optical recording/reproduction system that uses a solid immersion lens has recently been suggested as a technique for overcoming the aforementioned numerical aperture limitation.

A solid immersion lens has a spherical surface portion and a flat surface portion, the flat surface portion is formed in a shape constituting part of the sphere, and the flat surface portion is disposed in very close proximity to the surface of the optical recording medium. At the boundary surface of the solid immersion lens and the optical disk, an evanescent wave is transmitted and this evanescent wave reaches the information recording layer of the optical disk.

When the numerical aperture is thus made more than 1, where the thickness of air layer is not controlled to a sufficiently small level, the recording accuracy or reproduction accuracy is degraded by the decrease in the intensity of laser light focused on the information recording layer of the optical disk. Thus, for example, the recording accuracy or reproduction accuracy is degraded as mentioned hereinabove unless the gap between the solid immersion lens and the optical disk is made equal to or less than 100 nm, desirably equal to or less than about 50 nm.

Accordingly, Patent Literature 1 describes a method for controlling the gap between the solid immersion lens and the optical disk with such high accuracy.

The optical pickup disclosed in Patent Literature 1 will be described below with reference to FIG. 13. FIG. 13 illustrates the configuration of the conventional pickup.

The conventional optical pickup is configured by providing a solid immersion lens 101 having a spherical surface portion and a flat surface portion parallel to the surface of the optical information medium 108, as shown in FIG. 13.

The solid immersion lens 101 is for example of a semi-spherical shape and has a thickness substantially equal to the radius of the sphere. The distance (gap) between the flat surface portion of the solid immersion lens 101 and the surface of the optical information medium 108 is maintained by a servo-mechanism at about 1/10 of the emission wavelength of a semiconductor laser 103 serving as a light source.

In the conventional optical pickup, the gap error signal corresponding to the distance between the surface of the optical information medium 108 and the flat surface portion of the solid immersion lens 101 is obtained by detecting a component with a polarization state orthogonal to the polarization state of the reflected light at the time the distance between the surface of the optical information medium 108 and the flat surface portion of the solid immersion lens 101 is zero, in the reflected light (returned light) that has been obtained by emission from the semiconductor laser 103 and reflection by the optical information medium 108.

Thus, in the conventional optical pickup, the light flux emitted from the semiconductor laser 103 is converted by a collimator lens 104 into a parallel light flux that falls on a beam splitter 105.

The light flux emitted from the semiconductor laser 103 is transmitted by the beam splitter 105 and then falls on a polarization beam splitter 106. The light flux emitted from the semiconductor laser 103 becomes P polarized light with respect to the reflective surface of the polarization beam splitter 106. The P-polarized light flux is transmitted by the reflective surface and transmitted by the polarization beam splitter 106.

The light flux transmitted by the polarization beam splitter 106 is transmitted by a quarter-wavelength plate 107, which is disposed so that the crystal axis thereof is inclined at an angle of 45° with respect to the incident polarized light direction, and converted from linearly polarized light into circularly polarized light that falls on an objective lens 102. The objective lens 102 converges the incident parallel light flux and the converged light flux falls on the solid immersion lens 101. In the solid immersion lens 101, a focal point is formed close to the flat surface portion located in close proximity and parallel to the surface of the optical information medium 108. The refractive index of the solid immersion lens 101 is for example 1.8.

The focused light flux is focused as an evanescent wave on the information recording layer of the optical information medium 108. In this case, the numerical aperture of the objective lens 102 is for example about 1.36.

The optical pickup shown in FIG. 13 reproduces information signals from the optical information medium on which the information signals have been recorded by recording pits (concave and convex marks) or the optical information medium on which information signals have been recorded by using phase changes. Thus, the light flux focused on the information recording layer of the optical information medium 108 undergoes reflection that differs depending on the presence or absence of the recording pits on the information recording layer and returns to the polarization beam splitter 106 via the objective lens 102 and the quarter-wavelength plate 107.

The light flux that has been reflected by the optical information medium 108 and returned to the objective lens 102 is converted from the circularly polarized light into linearly polarized light by transmission through the quarter-wavelength plate 107. The polarization direction in this case is orthogonal to the polarization direction of the light flux emitted from the semiconductor laser 103. Therefore, the light flux that has been reflected by the optical information medium 108 and transmitted by the quarter-wavelength plate 107 becomes S polarized light with respect to the reflective surface of the polarization beam splitter 106. The S polarized reflected light is reflected by the reflective surface of the polarization beam splitter 106, comes off the optical path that returns to the semiconductor laser 103, and is received by the first detector 109 for obtaining the reproduction signal from the optical information medium 108.

In the conventional optical pickup, in a plane 111 perpendicular to the optical axis between the beam splitter 105 and the polarization beam splitter 106, the light flux emitted from the semiconductor laser 103 is linearly polarized light having only a field component in the same direction as that of the semiconductor laser 103.

In a state in which the flat surface portion of the solid immersion lens 101 is brought into intimate contact with the surface of the optical information medium 108, practically the entire reflected light becomes light in which the polarization direction has been rotated through 90° by back-and-forth movement though the quarter-wavelength plate 107. Therefore, a light flux with a distribution substantially identical to that of the light emitted from the semiconductor laser 103 falls on a plane 112 immediately in front of the first detector 109, that is, the plane 112 perpendicular to the optical axis between the polarization beam splitter 106 and the first detector 109. In this case, the reflected light from the optical information medium 108 practically does not return to the plane 111 between the beam splitter 105 and the polarization beam splitter 106.

Further, in a state in which the flat surface portion of the solid immersion lens 101 is separated from the surface of the optical information medium 108, the light incident at an angle greater than the critical angle of the flat surface portion, that is, the light with a numerical aperture greater than 1 (n×sin θ>1, n is a refractive index of the solid immersion lens; θ is an incidence angle of the light that will be focused), of the light that is focused in the vicinity of the flat surface portion of the solid immersion lens 101, is reflected by the flat surface portion.

Thus, the polarization state of the light reflected by the flat surface portion of the solid immersion lens 101 rotates due to the total reflection. Further, the light that underwent total reflection by the flat surface portion of the solid immersion lens 101 includes a polarization component perpendicular to the polarization direction of the reflected light obtained when the flat surface portion of the solid immersion lens 101 is in intimate contact with the surface of the optical information medium 108 as described hereinabove. Therefore, when the flat surface portion of the solid immersion lens 101 is separated from the surface of the optical information medium 108, the distribution of the returned light on the plate 111 between the beam splitter 105 and the polarization beam splitter 106 corresponds to a state in which only the peripheral portion of the light flux has returned.

The light that has thus returned to the plane 111 is reflected by the reflection surface of the beam splitter 105 and received by the second detector 110 for obtaining a gap error signal, as shown in FIG. 13. The gap error signal is a signal corresponding to the distance between the flat surface portion of the solid immersion lens 101 and the surface of the optical information medium 108.

In this case, the distribution of the returned light in the plane 112 immediately in front of the first detector 109 corresponds to a state in which the peripheral portion of the light flux is lost.

In the relationship between the light quantity received by the second detector 110 and the distance (air gap) between the flat surface portion of the solid immersion lens 101 and the surface of the optical information medium 108, where the position of the solid immersion lens 101 in the direction of approaching the optical information medium 108 and withdrawing therefrom is controlled so as to maintain the ratio of the light quantity at the second detector 110 to the incident light quantity at 0.2, the distance (air gap) between the flat surface portion of the solid immersion lens 101 and the surface of the optical information medium 108 can be maintained at 1/10 the wavelength.

Optical disks with a multilayer structure having two or three or more information recording layers have recently been suggested for use in optical information recording/reproduction systems using solid immersion lens, such as shown in FIG. 13, in order to increase further the capacity.

The problem encountered when information is recorded on or reproduced from such a multilayer optical disk in the optical pickup with a structure shown in FIG. 13 is that the reflected light from the information recording layers other than the object information recording layer used for recording or reproducing information is superimposed on the reflected light from the object information recording layer, and these reflected lights interfere with each other, thereby causing errors in the reproduction signal and gap error signal.

Further, the distance between the information recording layer used for recording or reproducing information and the flat surface portion of the solid immersion lens 101 increases. Therefore, the problem encountered in the case of the structure shown in FIG. 13 is that the focal point position of the reflected light from the light spot focused on the information recording layer and the focal point position of the reflected light from the flat surface portion of the solid immersion lens 101 shift significantly from each other, thereby narrowing the operation range of the gap error signal and making it impossible to detect correctly the gap position.

CITATION LIST

Patent Literature

Patent Literature 1: Japanese Patent Publication No. 4228666

SUMMARY OF INVENTION

The present invention has been created to resolve the above-described problems and it is an object of the present invention to provide an optical pickup, an optical disk drive device, an optical information recording device, and an optical information reproduction device in which reproduction signals, focus error signals, and gap error signals can be detected with high accuracy when information is recorded/reproduced on/from an optical information medium having a plurality of information recording layers.

The optical pickup according to one aspect of the present invention is an optical pickup for recording/reproducing information on/from an optical information medium having a plurality of information recording layers, including: a light source that emits light in a predetermined polarization state; a focusing lens group that includes a solid immersion lens having a flat surface portion parallel to a surface of the optical information medium and focuses the light; a first focusing unit that focuses reflected light obtained by reflection of the light focused by the focusing lens group from the optical information medium; a first photodetector that detects at least either a reproduction signal or a focus error signal by detecting a light quantity of reflected light from the optical information medium that has been focused by the first focusing unit; a second focusing unit that focuses reflected light obtained by reflection of the light focused by the focusing lens group from the flat surface portion of the solid immersion lens; and a second photodetector that detects a gap error signal corresponding to a distance between the surface of the optical information medium and the flat surface portion of the solid immersion lens by detecting a light quantity of reflected light from the flat surface portion of the solid immersion lens that has been focused by the second focusing unit, wherein an optical magnification ratio M of a first optical system including the focusing lens group and the first focusing unit and an optical magnification ratio m of a second optical system including the focusing lens group and the second focusing unit satisfy the condition M>m.

With such a configuration, the light source emits light with a predetermined polarization state. The focusing lens group includes a solid immersion lens having a flat surface portion parallel to the surface of the optical information medium and focuses the light. The first focusing unit focuses reflected light obtained by reflection of the light focused by the focusing lens group from the optical information medium. The first photodetector detects at least either a reproduction signal or a focus error signal by detecting a light quantity of reflected light from the optical information medium that has been focused by the first focusing unit. The second focusing unit focuses reflected light obtained by reflection of the light focused by the focusing lens group from the flat surface portion of the solid immersion lens. The second photodetector detects a gap error signal corresponding to a distance between the surface of the optical information medium and the flat surface portion of the solid immersion lens by detecting a light quantity of reflected light from the flat surface portion of the solid immersion lens that has been focused by the second focusing unit. The optical magnification ratio M of the first optical system including the focusing lens group and the first focusing unit and the optical magnification ratio m of the second optical system including the focusing lens group and the second focusing unit satisfy the condition M>m.

In accordance with the present invention, when information is recorded/reproduced on/from a multilayer optical information medium having a plurality of information recording layers, the effect produced by the reflected light from the information recording layers other than the information recording layer that is the object of recording or reproduction on the reproduction signal light and focus error signal light can be inhibited. Furthermore, since the gap error signal can be detected with high accuracy, the reproduction signal, focus error signal, and gap error signal can be detected with high accuracy when information is recorded/reproduced on/from an optical information medium having a plurality of information recording layers.

Objects, features, and merits of the present invention will become more apparent from the detailed description below and the appended drawings.

BRIEF DESCRIPTION OF DRAWINGS

FIG. 13 illustrates the configuration of the conventional optical pickup.

DESCRIPTION OF EMBODIMENTS

The embodiments of the present invention will be described below in greater detail with reference to the appended drawings. The embodiments described hereinbelow are specific examples of the present invention and should not be construed as limiting the technical scope of the present invention.

Embodiment 1

The optical pickup in Embodiment 1 of the present invention will be explained below with reference to FIG. 1.

Figure 1:
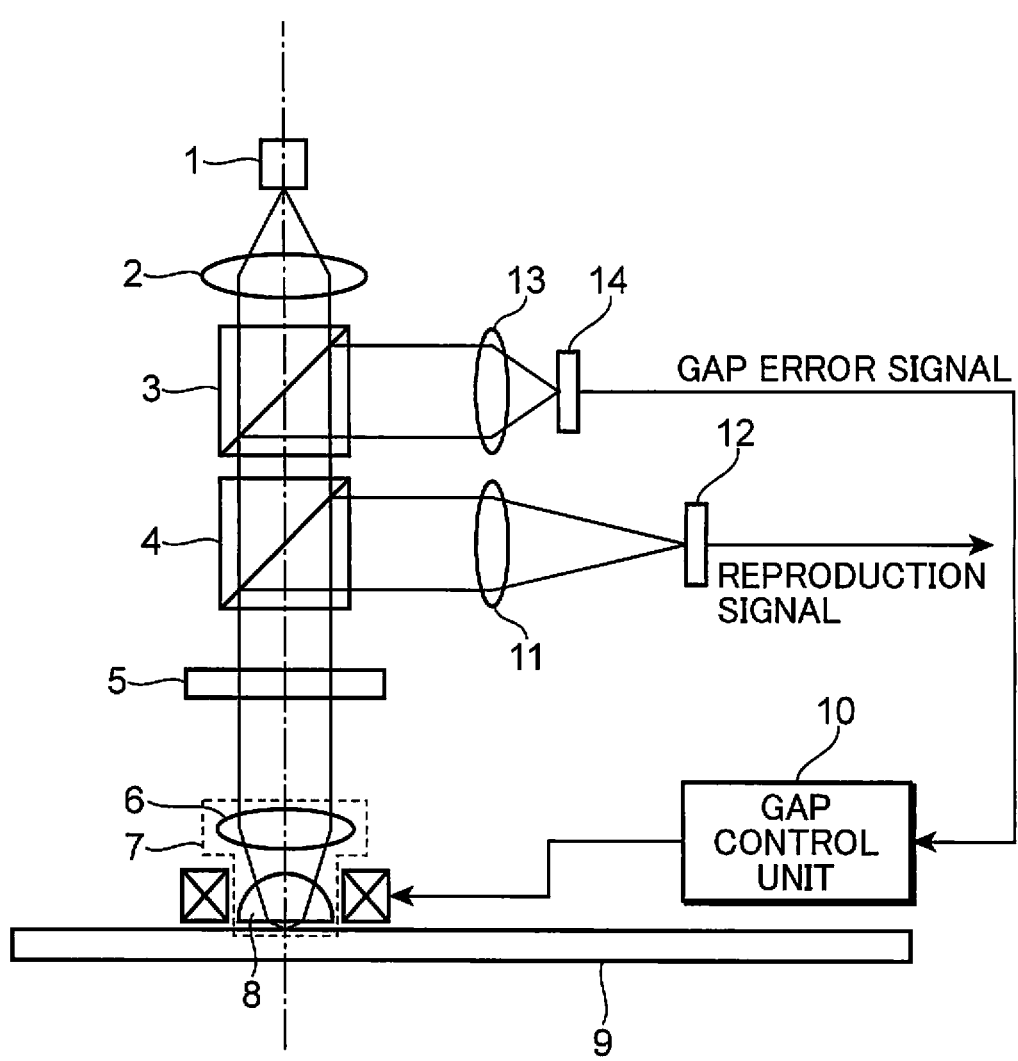
FIG. 1 illustrates the configuration of the optical pickup of Embodiment 1 of the present invention.

FIG. 1 illustrates the configuration of the optical pickup in Embodiment 1 of the present invention. The optical pickup shown in FIG. 1 is provided with a semiconductor laser 1, a collimator lens 2, a beam splitter 3, a polarization beam splitter 4, a quarter-wavelength plate 5, a focusing lens group 7, a first detection lens 11, a first detector 12, a second detection lens 13, and a second detector 14.

The semiconductor laser 1 emits light in a predetermined polarization state. As shown in FIG. 1, the focusing lens group 7 is constituted by a solid immersion lens (SIL) 8 having a spherical surface portion and a flat surface portion parallel to the surface of an optical information medium 9 and an objective lens 6. The numerical aperture of the focusing lens group 7 is equal to or greater than 1.5.

The solid immersion lens 8 has for example a semispherical shape and a thickness substantially equal to the radius of the sphere.

The first detection lens 11 focuses the reflected light obtained by reflection of the light focused by focusing lens group 7 from the optical information medium 9. The first detector 12 detects at least either a reproduction signal or a focus error signal by detecting the quantity of the reflected light from the optical information medium 9 that has been focused by the first detection lens 11.

The second detection lens 13 focuses on the second detector 14 the reflected light obtained by reflection of the light focused by the focusing lens group 7 from the flat surface portion of the solid imaging lens 8. The second detector 14 detects a gap error signal corresponding to the gap between the surface of the optical information medium 9 and the flat surface portion of the solid immersion lens 8 by detecting the light quantity of the reflected light from the flat surface portion of the solid immersion lens 8 that has been focused by the second detection lens 13.

The beam splitter 3 is disposed on the optical path of the light emitted from the semiconductor laser 1. The beam splitter 3 transmits the light emitted from the semiconductor laser 1 and reflects the reflected light from the flat surface portion of the solid immersion lens 8 toward the second detector 14.

The polarization beam splitter 4 is disposed on the optical path of the light transmitted by the beam splitter 3. The polarization beam splitter 4 transmits the light transmitted by the beam splitter 3 and reflects the reflected light from the optical information medium 9 toward the first detector 12.

The quarter-wavelength plate 5 is disposed on the optical path of the light transmitted by the polarization beam splitter 4. The focusing lens group 7 is disposed on the optical path of the light transmitted by the quarter-wavelength plate 5. The first detection lens 11 is disposed on the optical path of the reflected light from the optical information medium 9 that has been reflected by the polarization beam splitter 4. The second detection lens 13 is disposed on the optical path of the reflected light from the flat surface portion of the solid immersion lens 8 that has been reflected by the beam splitter 3.

A gap control unit 10 controls the distance between the flat surface portion of the solid immersion lens 8 and the surface of the optical information medium 9. The gap control unit 10 maintains the distance (gap) between the flat surface portion of the solid immersion lens 8 and the surface of the optical information medium 9 at a value, for example, equal to or less than about 50 nm.

In the optical pickup shown in FIG. 1, the gap error signal corresponding to the distance between the flat surface portion of the solid immersion lens 8 and the surface of the optical information medium 9 is obtained by detecting a component with a polarization state orthogonal to the polarization state of the reflected light at the time the distance between the flat surface portion of the solid immersion lens 8 and the surface of the optical information medium 9 is zero, in the reflected light (returned light) that has been obtained by emission from the semiconductor laser 1 and reflection by the optical information medium 9.

Thus, in the optical pickup, the light flux emitted from the semiconductor laser 1 is converted by the collimator lens 2 into a parallel light flux that falls on the beam splitter 3.

The light flux transmitted by the beam splitter 3 then falls on the polarization beam splitter 4. The light flux emitted from the semiconductor laser 1 becomes P polarized light with respect to the reflective surface of the polarization beam splitter 4. Therefore, the light flux incident on the polarization beam splitter 4 is transmitted by the reflective surface and transmitted by the polarization beam splitter 4.

The light flux transmitted by the polarization beam splitter 4 is converted into circularly polarized light by transmission via the quarter-wavelength plate 5 and falls on the objective lens 6.

The objective lens 6 converges the incident parallel light flux and the converged light flux falls on the solid immersion lens 8. The focal point of the objective lens 6 is formed close to the flat surface portion of the solid immersion lens 8 located in close proximity and parallel to the surface of the optical information medium 9.

Thus, the light flux focused on the flat surface portion of the solid immersion lens 8 is focused as an evanescent wave on the information recording layer of the optical information medium 9. In this case, the numerical aperture NA of the focusing lens group 7 is for example equal to or greater than 1.5.

The optical pickup shown in FIG. 1 performs reproduction from the optical information medium on which information signals have been recorded by recording pits (concave and convex marks) or the optical information medium on which information signals have been recorded by using phase changes. Thus, the light flux focused on the information recording layer of the optical information medium 9 undergoes reflection that differs depending on the presence or absence of the recording pits on the information recording layer and returns to the polarization beam splitter 4 via the focusing lens group 7 and the quarter-wavelength plate 5.

The light flux that has been reflected by the optical information medium 9 and returned to the focusing lens group 7 is converted from the circularly polarized light into linearly polarized light by transmission through the quarter-wavelength plate 5. The polarization direction in this case is orthogonal to the polarization direction of the light flux emitted from the semiconductor laser 1.

Therefore, the light flux that has been reflected by the optical information medium 9 and transmitted by the quarter-wavelength plate 5 becomes S polarized light with respect to the reflective surface of the polarization beam splitter 4. The S polarized reflected light is reflected by the reflective surface of the polarization beam splitter 4, focused by the first detection lens 11, and received by the first detector 12 for obtaining reproduction signals from the optical information medium 9.

Meanwhile, the polarization state of the reflected light from the flat surface portion of the solid immersion lens 8 rotates due to the total reflection. Therefore, the P polarization component is transmitted by the polarization beam splitter 4 and reflected by the reflective surface of the bean splitter 3. The light reflected by the beam splitter 3 is focused by the second detection lens 13 and received by the second detector 14 for obtaining a gap error signal. The gap error signal is a signal corresponding to the distance between the flat surface portion of the solid immersion lens 8 and the surface of the optical information medium 9.

In the relationship between the light quantity received by the second detector 14 and the distance (air gap) between the flat surface portion of the solid immersion lens 8 and the surface of the optical information medium 9, the gap control unit 10 controls the position of the solid immersion lens 8 in the direction of approaching the optical information medium 9 and withdrawing therefrom so as to maintain a predetermined light quantity at the second detector 14. As a result, the predetermined distance (air gap) between the flat surface portion of the solid immersion lens 8 and the surface of the optical information medium 9 can be maintained.

In the optical pickup of Embodiment 1, recording and reproduction of information on and from the multilayer optical information medium having a plurality (two or three or more) of information recording layers can be also performed by using a spherical aberration correction unit (not shown in the figure). In this case, the effect of returned light (stray light) from other information recording layers on the information recording layer where information is recorded or reproduced becomes an important issue.

The stray light in the multilayer optical information medium having three information recording layers L1, L2, L3 will be described below in greater detail with reference to FIG. 2.

Figure 2:
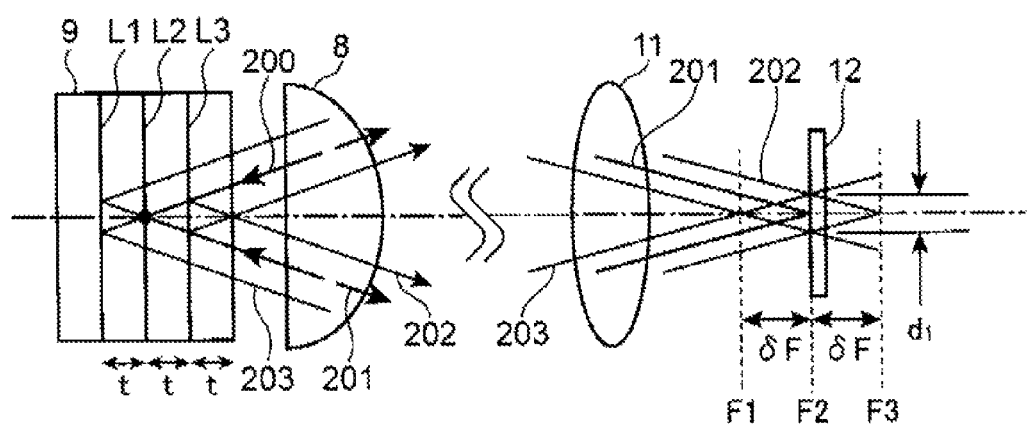
FIG. 2 illustrates the detection optical system for detecting the reproduction signal and focus error signal in the optical pickup shown in FIG. 1.

FIG. 2 illustrates a detection optical system for detecting reproduction signals and focus error signals in the optical pickup shown in FIG. 1.

More specifically, in the optical system shown in FIG. 2, the light from the semiconductor laser 1 falls on the optical information medium 9 and is then reflected from the optical information medium 9. The light reflected from the optical information medium 9 is focused by the first detection lens 11 on the first detector 12. In FIG. 2, only the solid immersion lens 8, optical information medium 9, first detection lens 11, and first detector 12 are represented and other constituent elements are omitted.

In FIG. 2, the information recording layers L1, L2, L3 are assumed to have equal spacing t and the same refractive index n, and the case is explained where the light emitted from the solid immersion lens 8 is focused on the information recording layer L2 and information is recorded on or reproduced from the information recording layer L2.

Thus, the optical information medium 9 has the information recording layer L1, information recording layer L2, and information recording layer L3 in the order of increasing distance from the light incidence surface, and the spacing between the information recording layer L1 and the information recording layer L2, the spacing between the information recording layer L2, and the information recording layer L3, and the spacing between the information recording layer L3 and the light incidence surface (surface of the optical information medium 9) are equal to each other. Further, the information recording layer L1, information recording layer L2, and information recording layer L3 have the same refractive index.

The stray light is generated by light reflected from all of the information recording layers, but the major role is played by the light reflected from the information recording layers (information recording layer L1 and information recording layer L3 in FIG. 2) adjacent to the layer where information is recorded or reproduced (information recording layer L2 in FIG. 2). Therefore, the attention will be focused only on the information recording layer L1, information recording layer L2, and information recording layer L3 shown in FIG. 2.

An emitted light 200 from the solid immersion lens 8 is focused on the information recording layer L2 and reflected as a reflected light 201 by the information recording layer L2.

The converged light which is part of the emitted light 200 from the solid immersion lens 8 is reflected as a reflected light 202 by the information recording layer L3 before reaching the information recording layer L2. Furthermore, part of the light focused on the information recording layer L2 is transmitted by the information recording layer L2 and reflected as a reflected light 203 by the information recording layer L1.

The reflected light 203 from the information recording layer L1 and the reflected light 202 from the information recording layer L3 return together with the reflected light (reproduction signal light) 201 from the information recording layer L2 to the solid immersion lens 8 and are then converged by the first detection lens 11 on the first detector 12. The first detector 12 obtains the reproduction signal on the basis of the received light.

In this case, the reflected light 201 from the information recording layer L2 is focused on the light receiving surface F2 of the first detector 12. The reflected light 203 from the information recording layer L1 is converged on a converging surface F1 that is at a distance $\delta F$ from the light receiving surface F2 in the direction of approaching the first detection lens 11, and the reflected light 202 from the information recording layer L3 is converged on a converging surface F3 that is at a distance $\delta F$ from the light receiving surface F2 in the direction opposite that toward the first detection lens 11. The reflected light 202 and the reflected light 203 reach the converging surface F2 as light beams, each with a light spot having a diameter $d_1$.

Therefore, the quantity of reflected light from the information recording layer L1 and the information recording layer L3 may be reduced with respect to the reproduction signal light quantity from the information recording layer L2 in the first detector 12 in order to suppress the effect of the stray light.

Thus, the diameter $d_1$ of the light beam may be greatly increased with respect to the size of the light receiving surface F2 of the first detector 12, and the take-in amount of the reflected light from the information recording layer L1 and the information recording layer L3 may be reduced.

Where the numerical aperture of the light emitted from the solid immersion lens 8 is denoted by $NA_1$ and the optical magnification ratio (lateral magnification ratio) of the detection optical system constituted by the first detection lens 11 and the light converging lens group 7 including the solid immersion lens 8 is denoted by M, the diameter $d_1$ of the light beam can be represented by the following Eq. (1).

$$d_1 = 4t/n \times M^2 \times NA_1/(M^2 - NA_1^2)^{1/2} \tag{1}$$

Where the size of the light receiving surface F2 of the first detector 12 is increased, the capacitance increases and therefore the frequency characteristic is worsened. Further, where the size of the light receiving surface F2 of the first detector 12 is made too small, this is disadvantageous from the standpoint of detection position variations caused by changes with time and temperature fluctuations.

Therefore, it is preferred that the size of the light receiving surface F2 of the first detector 12 be, for example, about 100 µm×100 µm.

When the spacing t of the information recording layers is 2 µm and the refractive index n of the material constituting the information recording layers is 1.6 and the surface area ratio of the stray light to the surface area of the light receiving element of the first detector 12 is calculated using the above-mentioned Eq. (1), a graph shown in FIG. 3 can be obtained.

Figure 3:
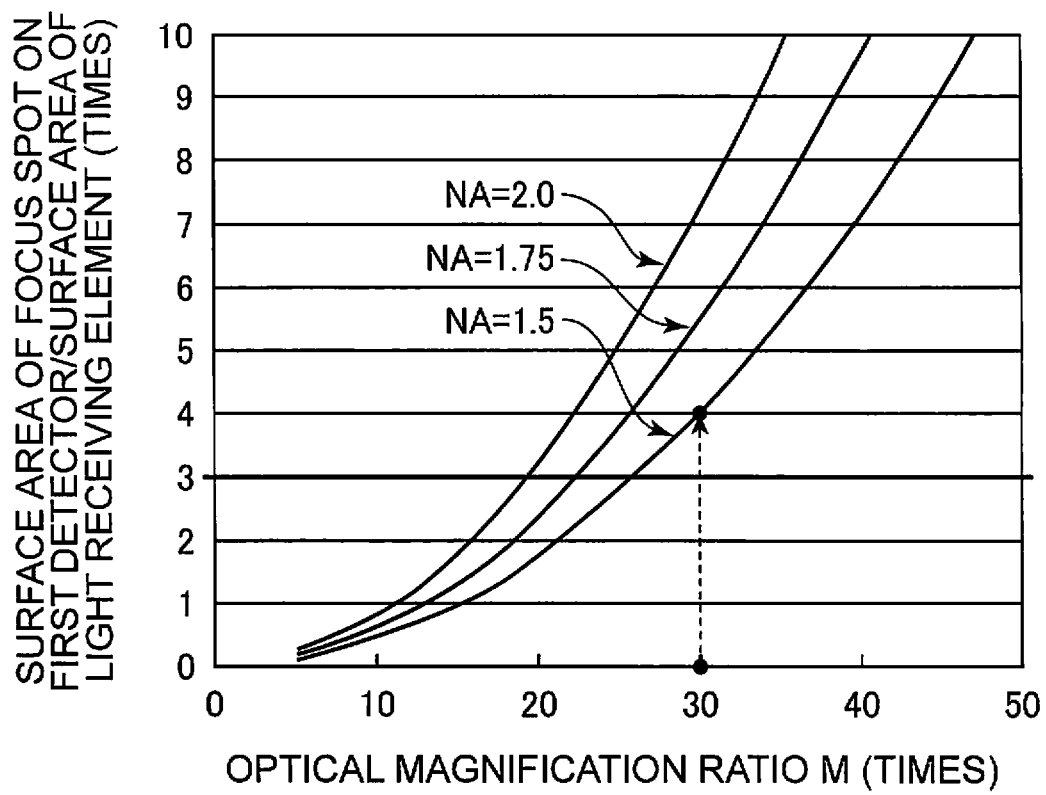
FIG. 3 shows the relationship between the optical magnification ratio M and the surface area ratio of the focus spot of the reproduction signal light and focus signal light on the first detector and the light receiving element in Embodiment 1 of the present invention.

FIG. 3 shows the relationship between the optical magnification ratio M and the surface area ratio of the focus spot of the reproduction signal light and focus signal light on the first detector and the light receiving element in Embodiment 1 of the present invention. In FIG. 3, the relationship between the optical magnification ratio M and the surface area ratio of the focus spot of the reproduction signal light and focus signal light on the first detector and the light receiving element is shown with respect to the case where the numerical aperture NA of the solid immersion lens 8 is 1.5, 1.75, and 2.0.

In order to reduce the effect of stray light on the reproduction signal light, it is necessary that the surface area of the stray light be at least three times the surface area of the light receiving surface of the first detector 12.

Therefore, the graph shown in FIG. 3 indicates that the first detection lens 11 is selected such that the optical magnification ratio M becomes equal to or greater than 30 when the numerical aperture of the solid immersion lens 8 is equal to or greater than 1.5. As a result, the surface area of the stray light becomes four or more times the surface area of the light receiving surface F2 (light receiving element) of the first detector 12, the effect produced by the reflected light from the information recording layers other than the information recording layer that is the object of recording or reproduction can be inhibited, good frequency characteristic is obtained, and a stable reproduction signal can be obtained.

As described hereinabove, the optical pickup of Embodiment 1 is provided with the semiconductor laser 1 (light source) that emits light with a predetermined polarization state, the focusing lens group 7 that includes the solid immersion lens 8 and focuses the light emitted from the semiconductor laser 1, the first detection lens 11 (first focusing unit) that focuses the reflected light obtained by reflection of the light focused by the focusing lens group 7 from the optical information medium 9, and a first detector 12 (first photodetector) that detects at least either a reproduction signal or a focus error signal by detecting a light quantity of reflected light from the optical information medium 9 that has been focused by the first detection lens 11.

Further, the optical magnification ratio M of the first optical system including the focusing lens group 7 and the first detection lens 11 is determined such that when the light is focused on a predetermined information recording layer from among the plurality of information recording layers, the surface area of a spot of reflected light from an information recording layer adjacent to the predetermined information recording layer on the first detector 12 is three or more times the surface area of the light receiving surface F2 of the first detector 12. With such a configuration, the effect of the stray light on the reproduction signal light can be reduced.

Further, in the optical pickup of Embodiment 1, when the numerical aperture of the focusing lens group 7 is equal to or greater than 1.5, the optical magnification ratio M of the first optical system satisfies the condition M≦30.

With such a configuration, the surface area of stray light becomes four or more times the surface area of the light receiving surface F2 of the first detector 12, the effect produced by the reflected light from the information recording layers other than the information recording layer that is the object of recording or reproduction can be inhibited, good frequency characteristic is obtained, and a stable reproduction signal can be obtained.

A gap error detection optical system that detects gap error signals in the multilayer optical information medium having three information recording layers L1, L2, L3 will be described below in greater detail with reference to FIG. 4 to FIG. 6.

Figure 4:
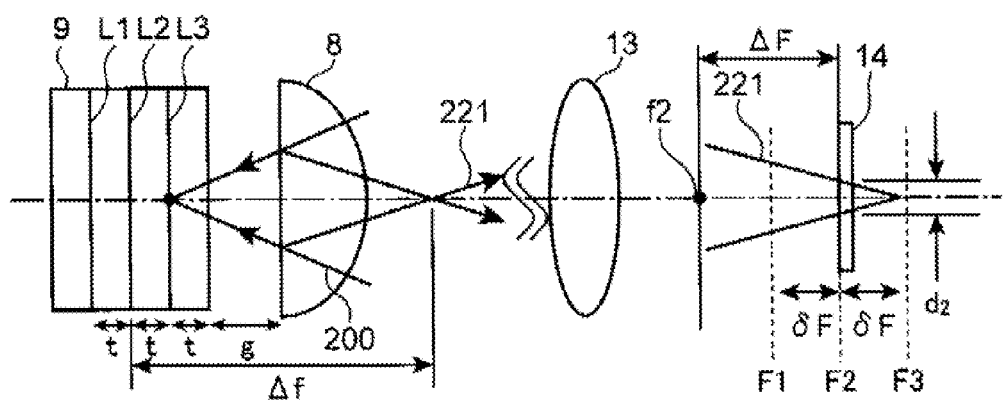
FIG. 4 is a diagram illustrating the reflected light obtained by reflection of the light focused on the information recording layer L3 from the flat surface portion of the solid immersion lens in the detection optical system for detecting the gap error signal.
Figure 5:
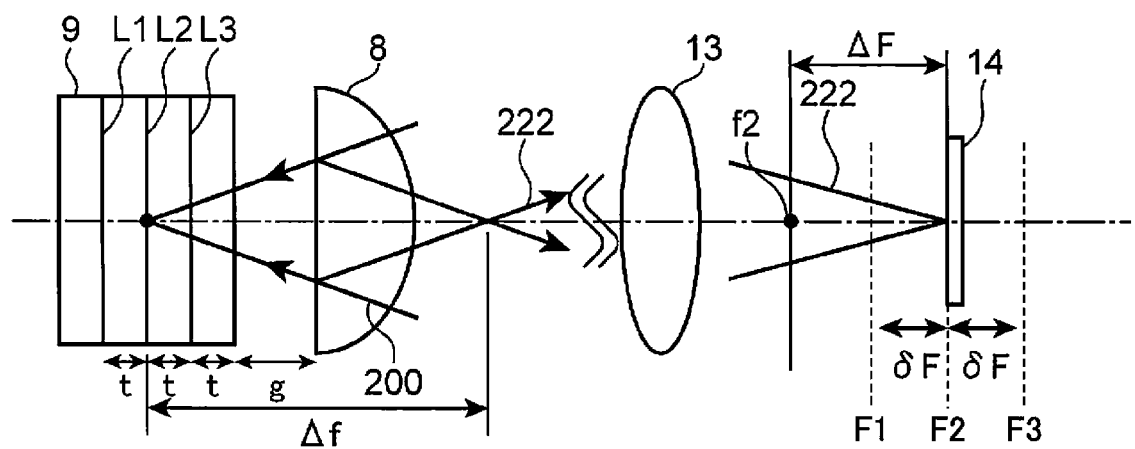
FIG. 5 is a diagram illustrating the reflected light obtained by reflection of the light focused on the information recording layer L2 from the flat surface portion of the solid immersion lens in the detection optical system for detecting the gap error signal.
Figure 6:
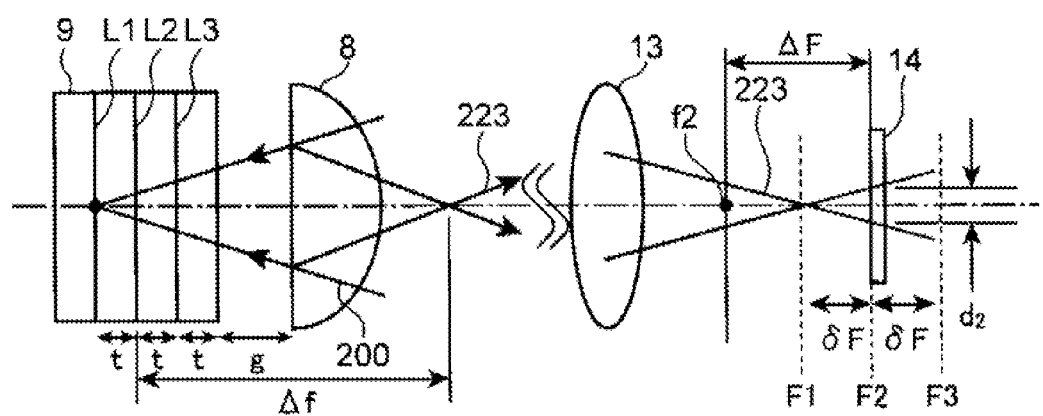
FIG. 6 is a diagram illustrating the reflected light obtained by reflection of the light focused on the information recording layer L1 from the flat surface portion of the solid immersion lens in the detection optical system for detecting the gap error signal.

FIG. 4 to FIG. 6 illustrate the detection optical system for detecting a gap error signal in the optical pickup shown in FIG. 1. FIG. 4 is a diagram illustrating the reflected light obtained by reflection of the light focused on the information recording layer L3 from the flat surface portion of the solid immersion lens 8 in the detection optical system for detecting the gap error signal. FIG. 5 is a diagram illustrating the reflected light obtained by reflection of the light focused on the information recording layer L2 from the flat surface portion of the solid immersion lens 8 in the detection optical system for detecting the gap error signal. FIG. 6 is a diagram illustrating the reflected light obtained by reflection of the light focused on the information recording layer L1 from the flat surface portion of the solid immersion lens 8 in the detection optical system for detecting the gap error signal.

More specifically, in the optical system shown in FIG. 4 to FIG. 6, the light reflected from the flat surface portion of the solid immersion lens 8 is focused by the second detection lens 13 on the second detector 14. In FIG. 4 to FIG. 6, only the solid immersion lens 8, optical information medium 9, second detection lens 13, and second detector 14 are shown and other constituent elements are omitted.

In FIG. 4 to FIG. 6, the case is explained where the information recording layers L1, L2, L3 have equal spacing t and the same refractive index n, the light emitted from the solid immersion lens 8 is selectively focused on the information recording layers L1, L2, L3, and information is recorded on or reproduced from each information recording layer.

In the configuration shown in FIG. 4 to FIG. 6, since the information recording layer L2 is positioned between the information recording layer L1 and the information recording layer L3, the optical system is disposed such that a position f2 that is optically conjugated with the information recording layer L2 matches the focal point position of the second detection lens 13.

In order to obtain the gap error signal by detecting the reflected light from the flat surface portion of the solid immersion lens 8, the reflected light from the flat surface portion of the solid immersion lens 8 is focused at a position (light receiving surface F2) shifted from the position f2 that is optically conjugated with the information recording layer L2.

Here, the distance (gap) between the flat surface portion of the solid immersion lens 8 to the optical information medium 9 is denoted by g, the virtual light emission point of the reflected light from the flat surface portion of the solid immersion lens 8 is taken as a position shifted by an optical path length Δf from the information recording layer L2 shown in FIG. 4 to FIG. 6, and the distance between the focal point where the light from the virtual light emission point is focused on the position f2 that is optically conjugated with the information recording layer L2 is taken as ΔF.

Where the optical magnification ratio (lateral magnification ratio) of the detection optical system constituted by the focusing lens group 7 including the solid immersion lens 8 shown in FIG. 4 to FIG. 6 and the second detection lens 13 is denoted by m, the distance ΔF can be represented by the following Eq. (2).

$$\Delta F = \Delta f \times m^2 = 2(2t/n + g) \times m^2 \qquad (2)$$

By disposing the light receiving surface of the second detection 14 at a position corresponding to the distance ΔF calculated by Eq. (2) above, it is possible to maximize the detection range of the gap error signal in the second detector 14.

However, when light is selectively focused on the information recording layer L1, information recording layer L2, or information recording layer L3 to record/reproduce information on/from the respective information recording layer, the size of the light spot on the second detector 14 corresponding to each information recording layer will change.

More specifically, FIG. 4 shows a state in which the emitted light 200 from the solid immersion lens 8 is focused on the information recording layer L3. The reflected light 221 from the flat surface portion of the solid immersion lens 8 is converged by the second detection lens 13 toward a convergence surface F3, and a light spot having a diameter $d_2$ is formed on the second detector 14.

Further, FIG. 5 shows a state in which the emitted light 200 from the solid immersion lens 8 is focused on the information recording layer L2. The reflected light 222 from the flat surface portion of the solid immersion lens 8 is converged by the second detection lens 13 toward the converging surface F2 of the second detector 14.

FIG. 6 shows a state in which the emitted light 200 from the solid immersion lens 8 is focused on the information recording layer L1. The reflected light 223 from the flat surface portion of the solid immersion lens 8 is converged by the second detection lens 13 toward the converging surface F1, and a light spot having a diameter $d_2$ is formed on the second detector 14.

Therefore, the size of the light spot on the second detector 14 obtained when the focal point position of the emitted light from the focusing lens group 7 including the solid immersion lens 8 is matched with the information recording layer L2 to record or reproduce information on or from the information recording layer L2 when the detection surface of the second detector 14 is disposed at the position corresponding to the distance ΔF calculated by Eq. (2) becomes the smallest.

However, the size of the light spot on the second detector 14 in the case where the focal point position of the emitted light of the focusing lens group 7 including the solid immersion lens 8 is focused on the information recording layer L1 or the information recording layer L3 to record or reproduce information to or from the information recording layer L1 or the information recording layer L3 becomes larger than the size of the light spot obtained when the focal position is matched with the information recording layer L2.

In order to detect accurately the gap error signal, the reflected light from the flat surface portion of the solid immersion lens 8 should be entirely taken in by the second detector 14 when the light is focused on each of the information recording layers.

For this purpose, it is necessary that the size of the light spot on the second detector 14 obtained when the light is focused on each information recording layer be less than the size of the light receiving element (light receiving surface).

The diameter $d_2$ of the light spot on the second detector 14 obtained when the light is focused on the information recording layer L1 or the information recording layer L3 in FIG. 4 to FIG. 6 is calculated using the following Eq. (3).

$$d_2 = 4t/n \times m^2 \times NA_1/(m^2 - NA_1^2)^{1/12} \qquad (3)$$

In Eq. (3) above, t represents the distance between the adjacent information recording layers, n—the refractive index of the information recording layers, m—the optical magnification ratio (lateral magnification ratio) of the detection optical system constituted by the focusing lens group 7 including the solid immersion lens 8 and the second detector lens 13, and $NA_1$ is the numerical aperture of the light emitted from the solid immersion lens 8.

Where the size of the light receiving surface of the second detector 14 is increased, the capacitance increases and the frequency characteristic is degraded. Further, where the size of the second detector 14 is made too small, it results in undesirable changes in detection position caused by changes with time and temperature fluctuations.

Therefore, it is preferred that the size of the light receiving surface of the second detector 14 be, for example, about 100 μm×100 μm, similarly to the first detector 12.

Figure 7:
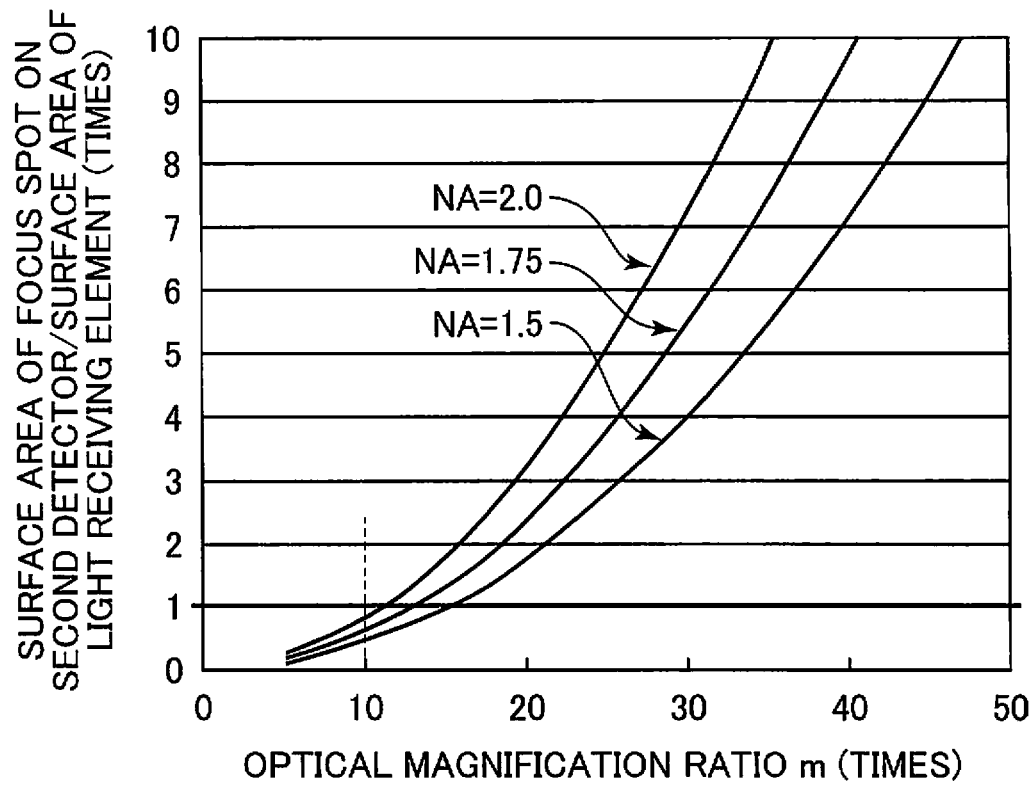
FIG. 7 shows the relationship between the optical magnification ratio m and the surface area ratio of the focus spot of the gap error signal light on the second detector and the light receiving element in Embodiment 1 of the present invention.

The graph shown in FIG. 7 is obtained when the surface area ratio of the light spot on the second detector 14 to the surface area of the light receiving element of the second detector 14 is calculated using Eq. (3) above with respect to the case where the distance t between the information recording layers is 2 μm and the refractive index n of the material constituting the information recording layers is 1.6.

FIG. 7 shows the relationship between the optical magnification ratio m and the surface area ratio of the focus spot of the gap error signal light on the second detector and the light receiving element in Embodiment 1 of the present invention. In FIG. 7, the relationship between the optical magnification ratio m and the surface area ratio of the focus spot of the gap error signal light on the second detector 14 and the light receiving element is shown in the cases where the numerical aperture NA of the solid immersion lens 8 is 1.5, 1.75, and 2.0.

Based on the graph shown in FIG. 7, the second detection lens 13 is selected such that the optical magnification ratio m becomes equal to or less than 10 when the numerical aperture of the solid immersion lens 8 is equal to or less than 2.0. As a result, the surface area ratio of the focus spot of the reflected light from the flat surface portion of the solid immersion lens 8 on the second detector 14 and the light receiving surface (light receiving element) of the second detector 14 is equal to or less than 1, the light spot is prevented at all times from projecting from the light receiving element (light receiving surface) of the second detector 14, and therefore a good frequency characteristic and a stable gap error signal can be obtained.

As described hereinabove, the optical pickup of Embodiment 1 is provided with the semiconductor laser 1 (light source) that emits light with a predetermined polarization state, the focusing lens group 7 that includes the solid immersion lens 8 and focuses the light emitted from the semiconductor laser 1, the second detection lens 13 (second focusing unit) that focuses the reflected light obtained by reflection of the light focused by the focusing lens group 7 from the flat surface portion of the solid immersion lens 8, and the second detector 14 (second photodetector) that detects a gap error signal corresponding to a distance between the surface of the optical information medium 9 and the flat surface portion of the solid immersion lens 8 by detecting the light quantity of reflected light from the flat surface portion of the solid immersion lens 8 that has been focused by the second detection lens 13.

In the optical pickup of Embodiment 1, the optical magnification ratio m of the second optical system including the focusing lens group 7 and the second detection lens 13 is determined such that, even when the light is focused on any information recording layer from among the plurality of information recording layers of the optical information medium 9, the surface area of the light spot on the second detector 14 is equal to or less than a surface area of the light receiving surface of the second detector 14.

With such a configuration, the size of the light spot on the second detector 14 obtained when the light is focused on each information recording layer is less than the size of the light receiving element. As a result, the reflected light from the flat surface portion of the solid immersion lens 8 is entirely taken in by the second detector 14 when the light is focused on each of the information recording layers. Therefore, the gap error signal can be accurately detected.

Further, in the optical pickup of Embodiment 1, when a numerical aperture of the focusing lens group 7 is equal to or less than 2.0, the optical magnification ratio m of the second optical system satisfy the condition m≦10.

With such a configuration, the surface area ratio is equal to or less than 1, the light spot is prevented at all times from projecting from the light receiving element (light receiving surface) of the second detector 14, and therefore a good frequency characteristic and a stable gap error signal can be obtained.

Further, the optical pickup of Embodiment 1 further includes the beam splitter 3 (first optical path splitting unit) that is disposed on the optical path of the light emitted from the semiconductor laser 1, transmits the light emitted from the semiconductor laser 1, and reflects reflected light from the flat surface portion of the solid immersion lens 8 toward the second detector 14; the polarization beam splitter 4 (second optical path splitting unit) that is disposed on an optical path of the light transmitted by the beam splitter 3, transmits the light transmitted by the beam splitter 3, and reflects reflected light from the optical information medium 9 toward the first detector 12; and the quarter-wavelength plate 5 disposed on the optical path of the light transmitted by the polarization beam splitter 4. The focusing lens group 7 is disposed on the optical path of the light transmitted by the quarter-wavelength plate 5.

Further, the first detection lens 11 (first focusing unit) is disposed on the optical path of reflected light from the optical information medium 9 that has been reflected by the polarization beam splitter 4.

The second detection lens 13 (second focusing unit) is disposed on the optical path of reflected light from the flat surface portion of the solid immersion lens 8 that has been reflected by the beam splitter 3.

According to the contents described hereinabove, in the detection optical system that is shown in FIG. 2 and detects the reproduction signal and focus error signal, the optical magnification ratio (lateral magnification ratio) M of the detection optical system should be increased, and in the detection optical system that is shown in FIG. 4 to FIG. 6 and detects the gap error signal, the optical magnification ratio (lateral magnification ratio) m of the detection optical system should be inhibited.

As described hereinabove, the diameter $d_1$ of the light spot of the reproduction signal light on the first detector 12 for reproduction signal detection is represented by Eq. (1) above.

In this configuration, the diameter $d_1$ should be made larger than the size of the light receiving surface of the first detector 12 in order to inhibit the effect of the reflected light from the information recording layers other than the information recording layer that is the object of recording or reproduction. In this case, for example, where the first detector 12 has a square shape, the diameter $d_1$ and the length $S_1$ of each side of the first detector 12 satisfy the relationship $d_1 > S_1$.

Further, as described hereinabove, the diameter $d_2$ of the light spot of the gap error signal light on the second detector 14 for gap error signal detection is represented by Eq. (3) above.

In this configuration, the diameter $d_2$ should be made less than the size of the light receiving surface of the second detector 14 in order to detect accurately the gap error signal in each information recording layer of the multilayer optical information medium. In this case, for example, where the second detector 14 has a square shape, the diameter $d_2$ and the length $S_2$ of each side of the second detector 14 satisfy the relationship $d_2 < S_2$.

The size S of the detector affects the frequency characteristic of the detection signal. Furthermore, the first detector 12 for reproduction signal detection and the second detector 14 for gap error signal detection should have the same frequency characteristic. For this reason, it is preferred that the length $S_1$ of each side of the first detector 12 and the length $S_2$ of each side of the second detector 14 satisfy the condition $S_1 = S_2$. Therefore, since $d_1 > S_1$ and $d_2 < S_2$, as indicated hereinabove, the diameter $d_1$ and the diameter $d_2$ satisfy the following relationship: $d_1 > d_2$.

The relationship between the diameter $d_1$ and the diameter $d_2$ can be represented by the following Eq. (4) on the basis of the above-mentioned Eq. (1) and Eq. (3).

$$4t/n \times M^2 \times NA_1/(M^2-NA_1^2)^{1/2} > 4t/n \times m^2 \times NA_1/(m^2-NA_1^2)^{1/12} \quad (4)$$

Since both sides of Eq. (4) are positive, where both sides are raised to the square and rearranged, the following Eq. (5) can be derived.

$$M^2/(M^2-NA_1^2)^{1/2} > m^2/(m^2-NA_1^2)^{1/2} \quad (5)$$

In the optical pickup, the converged light of the objective lens is as small as 1 μm or less. The photodetector is of an order of several hundreds of microns, that is, large. Therefore, the values of the optical magnification ratio M and optical magnification ratio m are large. By contrast, the numerical aperture of the objective lens is about 1.5. Therefore, where it is assumed that $M^2 >> NA_1^2$ and $m^2 >> NA_1^2$, Eq. (5) above can be represented as Eq. (6) below.

$$M > m \quad (6)$$

Therefore, where the optical magnification ratio M of the optical system including the focusing lens group 7 and the first detection lens 11 and the optical magnification ratio m of the optical system including the focusing lens group 7 and the second detection lens 13 satisfy the relationship represented by Eq. (6) above, the effect of the reflected light from the information recording layers other than the information recording layer that is the object of recording or reproduction can be inhibited and the gap error signal can be detected with high accuracy.

Thus, when information is recorded on or reproduced from a multilayer optical information medium having a plurality (two, three or more) of information recording layers in the optical pickup shown in FIG. 1, it is preferred that the optical magnification ratio (lateral magnification ratio) M of the optical system that detects the reproduction signal and focus error signal be larger than the optical magnification ratio (lateral magnification ratio) m of the optical system that measures the gap error signal.

More specifically, as described hereinabove, it is desirable that the optical magnification ratio M be equal to or greater than 30 and the optical magnification ratio m be equal to or less than 10. As a result, the frequency characteristic is good and stable reproduction signal and gap error signal can be obtained.

As a result, when information is recorded on or reproduced from a multilayer optical information medium having a plurality (two, three or more) information recording layers, the effect of the reflected light from the information recording layers other than the information recording layer that is the object of recording or reproduction on the reproduction signal light and focus error signal light can be inhibited and the gap error signal can be detected with high accuracy. Therefore, even when a high-density optical information medium is realized in a multilayer configuration, servo can be performed with good stability and information can be recorded and reproduced with a low error ratio in an optical pickup using a solid immersion lens.

FIG. 4 to FIG. 6 illustrate the case where the number of information recording layers in the optical information medium 9 is three, but where the number of information recording layers in the optical information medium 9 is k, the value of the distance ΔF can be represented by the following Eq. (7).

$$\Delta F = 2(((1+k)/2)t/n + g) \times m^2 \qquad (7)$$

By disposing the light receiving surface of the second detection 14 at a position corresponding to the distance ΔF calculated by Eq. (7) above, it is possible to maximize the detection range of the gap error signal in the second detector 14.

Further, in Embodiment 1, the case is explained where the light emitted from the solid immersion lens 8 is focused on the information recording layer L2 and information is recorded on or reproduced from the information recording layer L2, but the explanation above is also applicable to the case where information is recorded on or reproduced from another information recording layer other than the information recording layer L2.

In Embodiment 1, the light flux emitted from the semiconductor laser 1 is converted by the collimator lens 2 into a parallel light flux, and the parallel light flux is focused by the focusing lens group 7 on the optical information medium 9, but the optical pickup of Embodiment 1 may be also configured such that focus position control is performed by changing the position of the collimator lens 2 in the optical axis direction. As a result, for example, since the focus control is performed, while maintaining a constant gap between the optical information medium 9 and the solid immersion lens 8 at all times, a constant optical coupling efficiency of the solid immersion lens 8 and the optical information medium 9 can be obtained and stable signal reproduction and gap control can be performed.

Further, the optical pickup of Embodiment 1 may be configured to have a limited optical system in which the collimator lens 2 is omitted and the light flux emitted from the semiconductor laser 1 is focused on the optical information medium 9 by the focusing lens group 7.

In this case, either of the first detection lens 11 and the second detection lens 13 can be omitted, thereby making it possible to simplify the optical configuration.

In Embodiment 1, the solid immersion lens 8 has a semispherical shape, but such a shape is not limiting and, for example, an ultraspheric shape may be used.

In the configuration shown in FIG. 1, the distance from the polarization beam splitter 4 to the first detection lens 11 is equal to the distance from the beam splitter 3 to the second detection lens 13, and the distance from the first detection lens 11 to the first detector 12 is different from the distance from the second detection lens 13 to the second detector 14, but the present invention is not limited to such a configuration. For example, the first detector 12 and the second detector 14 may be different light receiving portions of the same detector, and the distance from the polarization beam splitter 4 to the first detection lens 11 may be made different from the distance from the beam splitter 3 to the second detection lens 13.

Further, in the configuration shown in FIG. 1, the beam splitter 3 and the polarization beam splitter 4 have cubical shape, but the present invention is not limited to such a configuration and the splitter may have, for example, a plate shape.

Further, in Embodiment 1, the size of the light receiving surface of the detectors is 100 μm×100 μm, the distance t between the information recording layers is 2 μm, and the refractive index n of the material constituting the information recording layers is 1.6, but those numerical values are not limiting.

Embodiment 2

The optical pickup of Embodiment 2 of the present invention will be explained below with reference to FIG. 8.

Figure 8:
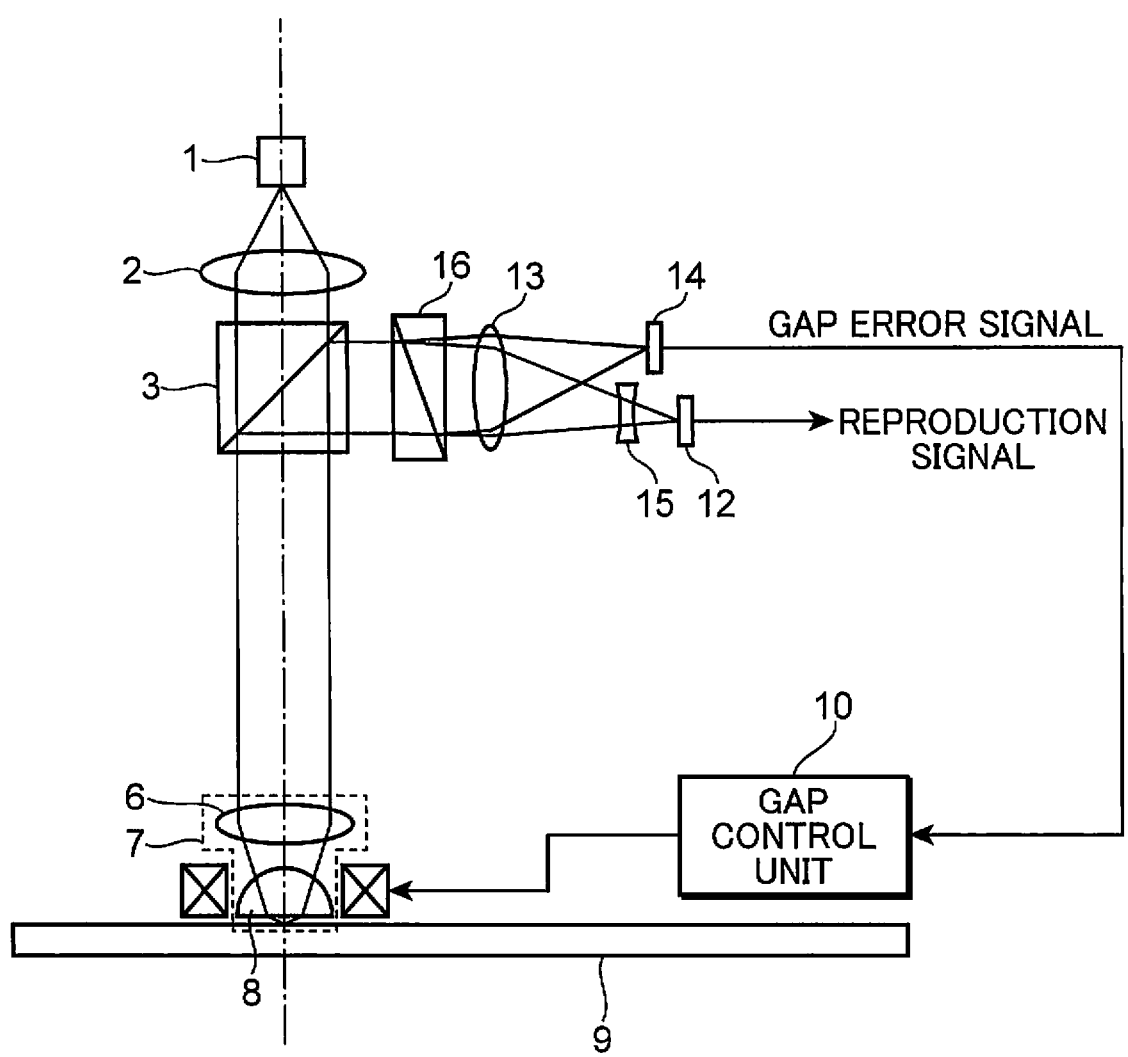
FIG. 8 illustrates the configuration of the optical pickup of Embodiment 2 of the present invention.

FIG. 8 shows the configuration of the optical pickup of Embodiment 2 of the present invention. The optical pickup shown in FIG. 8 is provided with the semiconductor laser 1, collimator lens 2, beam splitter 3, focusing lens group 7, first detector 12, second detection lens 13, second detector 14, lens 15, and polarization optical element 16. The focusing lens group 7 is provided with the objective lens 6 and the solid immersion lens 8. In the optical pickup shown in FIG. 8, components identical to those of the optical pickup shown in FIG. 1 are assigned with same reference numerals and detailed explanation hereof is herein omitted.

By contrast with the optical pickup shown in FIG. 1, the optical pickup shown in FIG. 8 has a configuration in which the reproduction signal light (and/or focus error signal light) and the gap error signal light are obtained from the reflected light from the same beam splitter 3, the reproduction signal light and the gap error signal light are separated by the polarization optical element 16, and the reproduction signal light and the gap error signal light are detected by respective different detectors.

The beam splitter 3 is disposed on the optical path of the light emitted from the semiconductor laser 1. The beam splitter 3 transmits the light emitted from the semiconductor laser 1, and reflects the mixed light including the reflected light from the flat surface portion of the solid immersion lens 8 and the reflected light from the optical information medium 9.

The polarization optical element 16 is disposed on the optical path of the mixed light reflected by the beam splitter 3. The polarization optical element 16 separates the mixed light reflected by the beam splitter 3 into the reflected light from the flat surface portion of the solid immersion lens 8 and the reflected light from the optical information medium 9. The focusing lens group 7 is disposed on the optical path of the light transmitted by the beam splitter 3.

The second detection lens 13 focuses the reflected light from the optical information medium 9 that has been separated by the polarization optical element 16 on the first detector 12 and focuses the reflected light from the flat surface portion of the solid immersion lens 8 that has been separated by the polarization optical element 16 on the second detector 14. The lens 15 further focuses or diverges on the first detector 12 the reflected light from the optical information medium 9 that has been focused by the second detection lens 13.

In the configuration shown in FIG. 8, the light flux emitted from the semiconductor laser 1 is converted by the collimator lens 2 into a parallel light flux that falls on the beam splitter 3. The light flux transmitted by the beam splitter 3 falls on the objective lens 6 that together with the solid immersion lens 8 constitutes the focusing lens group 7.

The objective lens 6 converges the incident parallel light flux and the converged light flux falls on the solid immersion lens 8. The focal point of the objective lens 6 is formed close to the flat surface portion of the solid immersion lens 8 that is provided close and parallel to the surface of the optical information medium 9. The light flux focused by the objective lens 6 is focused by the solid immersion lens 8 as an evanescent wave on the information recording layer of the optical information medium 9. A portion of the light flux focused by the objective lens 6 is reflected by the flat surface portion of the solid immersion lens 8.

The reflected light from the information recording layer of the optical information medium 9 is reflected by the reflective surface of the beam splitter 3. The light reflected by the beam splitter 3 is separated by the polarization optical element 16 from the reflected light from the flat surface portion of the solid immersion lens 8 and focused by the second detection lens 13. The reflected light from the optical information medium 9 that has been focused by the second detection lens 13 is further transmitted by the lens 15 and received by the first detector 12 for obtaining the reproduction signal from the optical information medium 9.

Further, the reflected light from the flat surface portion of the solid immersion lens 8 is reflected by the reflective surface of the beam splitter 3. The light reflected by the beam splitter 3 is separated by the polarization optical element 16 from the reflected light from the optical information medium 9. In this case, the polarization state of the reflected light from the flat surface portion of the solid immersion lens 8 is rotated due to the complete reflection at the flat surface portion of the solid immersion lens 8. Therefore, the reflected light from the flat surface portion of the solid immersion lens 8 is polarized in the direction different from that of the reflected light from the optical information medium 9.

Hence, the reflected light from the flat surface portion of the solid immersion lens 8 is transmitted by the second detection lens 13 and then focused on the second detector 14 disposed at a position different from that of the first detector 12. A gap error signal corresponding to the distance between the solid immersion lens 8 and the optical information medium 9 is obtained on the basis of the signal output from the second detector 14.

In the relationship between the light quantity received by the second detector 14 and the distance (air gap) between the flat surface portion of the solid immersion lens 8 and the surface of the optical information medium 9, the gap control unit 10 controls the position of the solid immersion lens 8 in the direction of approaching the optical information medium 9 and withdrawing therefrom so as to maintain a predetermined light quantity at the second detector 14. As a result, the predetermined distance (air gap) between the flat surface portion of the solid immersion lens 8 and the surface of the optical information medium 9 can be maintained.

In the optical pickup shown in FIG. 8, in order to record/reproduce information effectively on/from a multilayer optical information medium, the second detection lens 13 and the lens 15 should be selected such that, similarly to Embodiment 1, the optical magnification ratio (lateral magnification ratio) M of the detection optical system for detecting the reproduction signal and focus error signal be larger than the optical magnification ratio (lateral magnification ratio) m of the detection optical system for detecting the gap error signal. The lens 15 is, for example, a concave lens.

A Wollaston prism or a polarization hologram can be used as the polarization separation element 16.

The Wollaston prism is an optical element which separates light beams by changing the angle of the emitted light according to the polarization of the incident light beams.

The polarization hologram is an optical element that diffracts only the light beam with a specific polarization and transmits, without diffraction, light beams with a polarization different from the specific polarization.

Other features are similar to those of Embodiment 1.

As described hereinabove, the optical pickup of Embodiment 2 is provided with the semiconductor laser 1 (light source) that emits light with a predetermined polarization state, the focusing lens group 7 that includes the solid immersion lens 8 and focuses the light emitted from the semiconductor laser 1, the second detection lens 13 and the lens 15 (first focusing unit) that focuses the reflected light obtained by reflection of the light focused by the focusing lens group 7 from the optical information medium 9, and a first detector 12 (first photodetector) that detects at least either a reproduction signal or a focus error signal by detecting the light quantity of the reflected light from the optical information medium 9 that has been focused by the second detection lens 13 and the lens 15.

The optical pickup of Embodiment 2 is also provided with the second detection lens 13 (second focusing unit) that focuses the reflected light obtained by reflection of the light focused by the focusing lens group 7 from the flat surface portion of the solid immersion lens 8, and a second detector 14 (second photodetector) that detects a gap error signal corresponding to the distance between the surface of the optical information medium 9 and the flat surface portion of the solid immersion lens 8 by detecting the light quantity of the reflected light from the flat surface portion of the solid immersion lens 8 that has been focused by the second detection lens 13.

Further, the optical pickup of Embodiment 2 is also provided with the beam splitter 3 (optical path splitting unit) that is disposed on the optical path of the light emitted from the semiconductor laser 1, transmits the light emitted from the semiconductor laser 1, and reflects mixed light including the reflected light from the flat surface portion of the solid immersion lens 8 and the reflected light from the optical information medium 9, and the polarization optical element 16 (polarization separation element) that is disposed on the optical path of the mixed light reflected by the bean splitter 3 and separates the mixed light reflected by the beam splitter 3 into the reflected light from the flat surface portion of the solid immersion lens 8 and the reflected light from the optical information medium 9. Further, the focusing lens group 7 is disposed on the optical path of the light transmitted by the beam splitter 3.

Further, the first focusing unit in Embodiment 2 includes the second detection lens 13 (third light focusing lens) that focuses the reflected light from the optical information medium 9 that has been separated by the polarization optical element 16 on the first detector 12 and focuses the reflected light from the flat surface portion of the solid immersion lens 8 that has been separated by the polarization optical element 16 on the second detector 14 and the lens 15 (fourth light focusing lens) that further focuses or diverges on the first detector 12 the reflected light from the optical information medium 9 that has been focused by the second detection lens 13.

The second focusing unit in Embodiment 2 includes the second detection lens 13 (third light focusing lens).

In Embodiment 2, the number of optical components can be reduced by comparison with that in Embodiment 1. Therefore, the configuration of the optical system can be reduced in size, and the optical pickup can be reduced in cost.

Embodiment 3

The optical pickup of Embodiment 3 of the present invention will be explained below with reference to FIG. 9.

Figure 9:
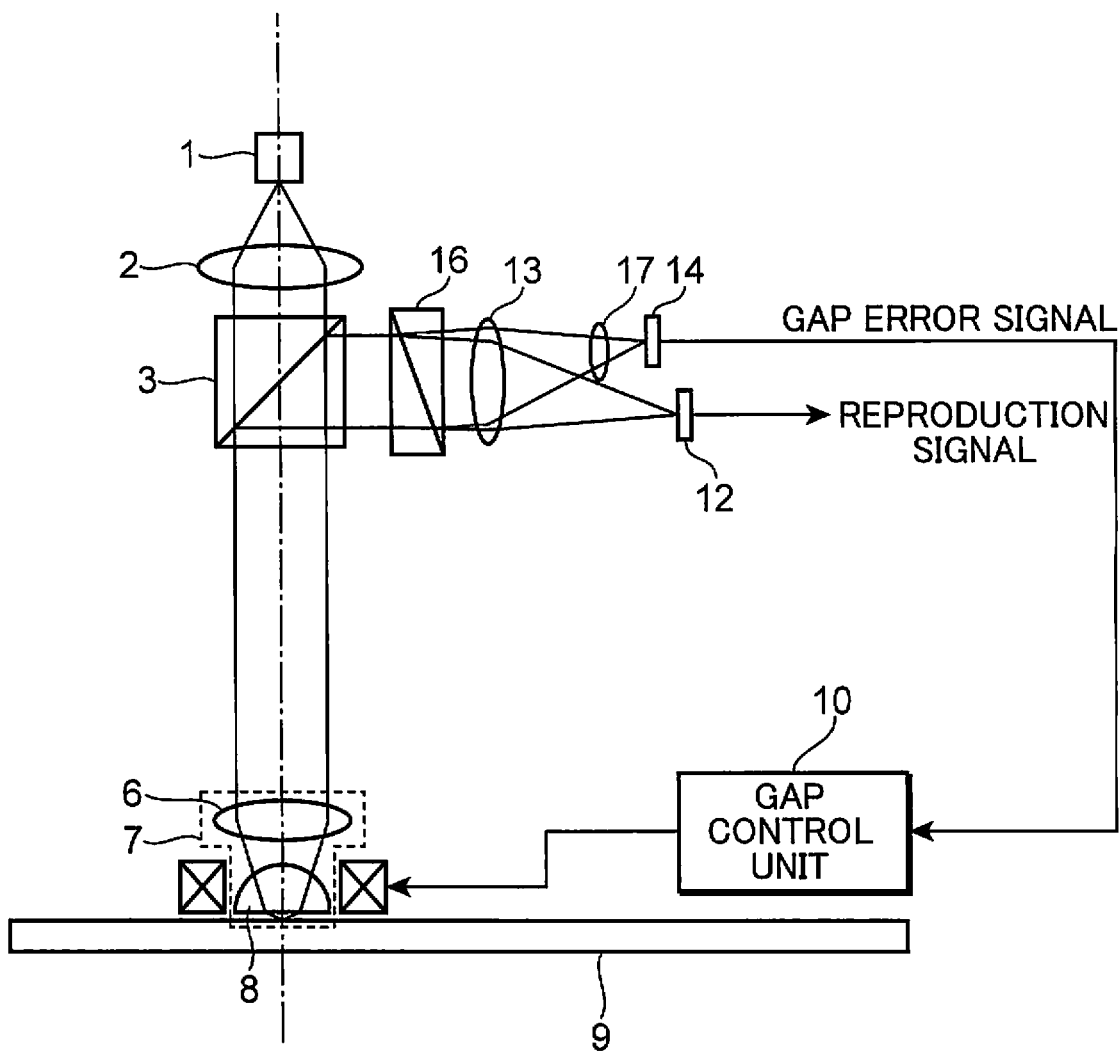
FIG. 9 illustrates the configuration of the optical pickup of Embodiment 3 of the present invention.

FIG. 9 shows the configuration of the optical pickup of Embodiment 3 of the present invention. The optical pickup shown in FIG. 9 is provided with the semiconductor laser 1, collimator lens 2, beam splitter 3, focusing lens group 7, first detector 12, second detection lens 13, second detector 14, polarization optical element 16, and lens 17. The focusing lens group 7 is provided with the objective lens 6 and the solid immersion lens 8. In the optical pickup shown in FIG. 9, components identical to those of the optical pickups shown in FIG. 1 and FIG. 8 are assigned with same reference numerals and detailed explanation hereof is herein omitted.

By contrast with the optical pickup shown in FIG. 8, the optical pickup shown in FIG. 9 has a configuration in which the lens 17 is disposed between the second detection lens 13 and the second detector 14 so that the optical magnification ratio (lateral magnification ratio) M of the detection optical system for detecting the reproduction signal and focus error signal becomes larger than the optical magnification ratio (lateral magnification ratio) m of the detection optical system for detecting the gap error signal. The lens 17 is, for example, a convex lens.

The beam splitter 3 is disposed on the optical path of the light emitted from the semiconductor laser 1. The beam splitter 3 transmits the light emitted from the semiconductor laser 1, and reflects the mixed light including the reflected light from the flat surface portion of the solid immersion lens 8 and the reflected light from the optical information medium 9.

The polarization optical element 16 is disposed on the optical path of the mixed light reflected by the beam splitter 3. The polarization optical element 16 separates the mixed light reflected by the beam splitter 3 into the reflected light from the flat surface portion of the solid immersion lens 8 and the reflected light from the optical information medium 9. The focusing lens group 7 is disposed on the optical path of the light transmitted by the beam splitter 3.

The second detection lens 13 focuses the reflected light from the optical information medium 9 that has been separated by the polarization optical element 16 on the first detector 12 and focuses the reflected light from the flat surface portion of the solid immersion lens 8 that has been separated by the polarization optical element 16 on the second detector 14.

The lens 17 further focuses on the second detector 14 the reflected light from the flat surface portion of the solid immersion lens 8 that has been focused by the second detection lens 13.

Other features are similar to those of Embodiment 1 and Embodiment 2.

As described hereinabove, the optical pickup of Embodiment 3 is provided with the semiconductor laser 1 (light source) that emits light with a predetermined polarization state, the focusing lens group 7 that includes the solid immersion lens 8 and focuses the light emitted from the semiconductor laser 1, the second detection lens 13 (first focusing unit) that focuses the reflected light obtained by reflection of the light focused by the focusing lens group 7 from the optical information medium 9, and a first detector 12 (first photodetector) that detects at least either a reproduction signal or a focus error signal by detecting the light quantity of the reflected light from the optical information medium 9 that has been focused by the second detection lens 13.

The optical pickup of Embodiment 3 is also provided with the second detection lens 13 and the lens 17 (second focusing unit) that focuses the reflected light obtained by reflection of the light focused by the focusing lens group 7 from the flat surface portion of the solid immersion lens 8, and a second detector 14 (second photodetector) that detects a gap error signal corresponding to the distance between the surface of the optical information medium 9 and the flat surface portion of the solid immersion lens 8 by detecting the light quantity of the reflected light from the flat surface portion of the solid immersion lens 8 that has been focused by the second detection lens 13 and the lens 17.

Further, the optical pickup of Embodiment 3 is also provided with the beam splitter 3 (optical path splitting unit) that is disposed on the optical path of the light emitted from the semiconductor laser 1, transmits the light emitted from the semiconductor laser 1, and reflects mixed light including the reflected light from the flat surface portion of the solid immersion lens 8 and the reflected light from the optical information medium 9, and the polarization optical element 16 (polarization separation element) that is disposed on the optical path of the mixed light reflected by the bean splitter 3 and separates the mixed light reflected by the beam splitter 3 into the reflected light from the flat surface portion of the solid immersion lens 8 and the reflected light from the optical information medium 9. Further, the focusing lens group 7 is disposed on the optical path of the light transmitted by the beam splitter 3.

Further, the first focusing unit in Embodiment 3 includes the second detection lens 13 (first light focusing lens) that focuses the reflected light from the optical information medium 9 that has been separated by the polarization optical element 16 on the first detector 12 and focuses the reflected light from the flat surface portion of the solid immersion lens 8 that has been separated by the polarization optical element 16 on the second detector 14.

The second focusing unit in Embodiment 3 includes the second detection lens 13 (first light focusing lens) and the lens 17 (second light focusing lens) that further focuses the reflected light from the flat surface portion of the solid immersion lens 8 that has been focused by the second detection lens 13 on the second detector 14.

In Embodiment 3, the number of optical components can be reduced by comparison with that in Embodiment 1. Therefore, the configuration of the optical system can be reduced in size, and the optical pickup can be reduced in cost.

Embodiment 4

The optical pickup of Embodiment 4 of the present invention will be explained below with reference to FIG. 10.

Figure 10:
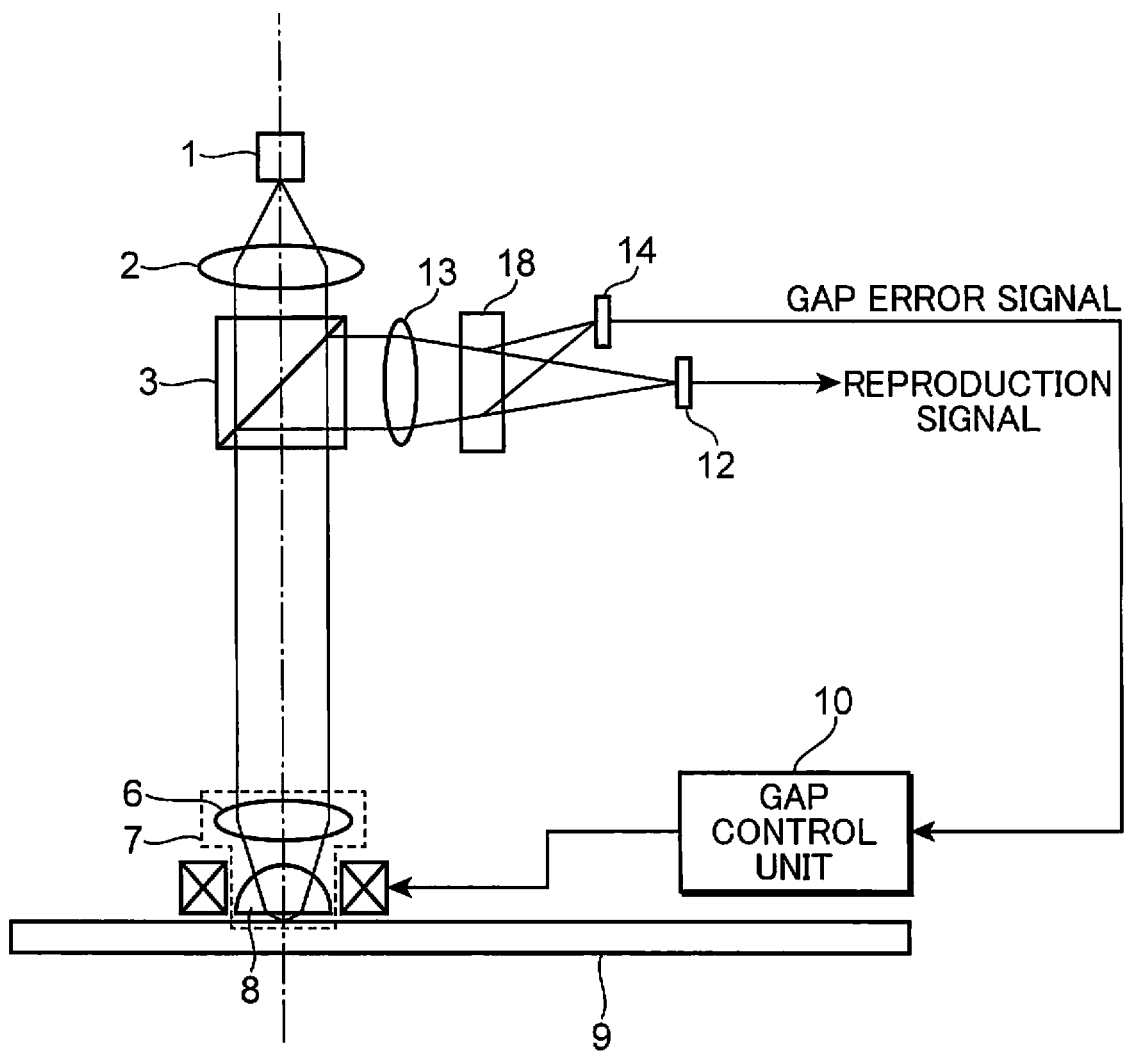
FIG. 10 illustrates the configuration of the optical pickup of Embodiment 4 of the present invention.

FIG. 10 shows the configuration of the optical pickup of Embodiment 4 of the present invention. The optical pickup shown in FIG. 10 is provided with the semiconductor laser 1, collimator lens 2, beam splitter 3, focusing lens group 7, first detector 12, second detection lens 13, second detector 14, and a polarization hologram 18. The focusing lens group 7 is provided with the objective lens 6 and the solid immersion lens 8. In the optical pickup shown in FIG. 10, components identical to those of the optical pickups shown in FIG. 1, FIG. 8, and FIG. 9 are assigned with same reference numerals and detailed explanation hereof is herein omitted.

By contrast with the optical pickup shown in FIG. 9, in the optical pickup shown in FIG. 10 the polarization hologram 18 is disposed between the second detection lens 13 and the first detector 12 and second detector 14.

The polarization hologram 18 has a polarization separation function of diffracting a specific polarized light. Further, the polarization hologram 18 is constituted by a diffraction lens having a lens function with respect to the reproduction signal light and/or gap error signal light such that the optical magnification (lateral magnification) M of the detection optical system for detecting the reproduction signal and focus error signal becomes larger than the optical magnification (lateral magnification) m of the detection optical system for detecting the gap error signal, in the same manner as in Embodiments 1 to 3.

The specific operation of Embodiment 4 will be described below with reference to FIG. 10.

In FIG. 10, the polarization hologram 18 has a structure that does not act upon the light with a polarization direction same as that of the reproduction signal light and focus error signal light. Therefore, the reproduction signal light and focus error signal light transmitted by the second detection lens 13 are transmitted "as is" by the polarization hologram 18 and focused on the first detector 12.

Meanwhile, the polarization hologram 18 has a structure that diffracts light with a polarization direction same as that of the gap error signal light and also demonstrates a focusing action of a diffraction lens.

Therefore, the gap error signal light passes through the polarization hologram 18 and is thereafter simultaneously focused and diffracted, the combined focal point distance is shortened, and the light falls on the second detector 14.

As a result, the magnification ratio of the optical beam focused on the second detector 14 becomes less than the magnification ratio of the optical beam focused on the first detector 12, and the relationship in which the optical magnification (lateral magnification) M of the detection optical system for detecting the reproduction signal and focus error signal becomes larger than the optical magnification (lateral magnification) m of the detection optical system for detecting the gap error signal is fulfilled.

In Embodiment 4, the number of optical components can be further reduced by comparison with that in Embodiments 1 to 3. Therefore, the configuration of the optical system can be further reduced in size and the cost of the optical pickup can be reduced.

Further, in Embodiment 4, the polarization hologram 18 acts as a diffractive lens with respect to the light with a polarization direction same as that of the gap error signal light, but does not act as the diffractive lens with respect to the light with a polarization direction same as that of the reproduction signal light and focus error signal light, but the present invention is not limited to such a configuration. Thus, the polarization hologram 18 may be configured to act as a diffractive lens with respect to the light with a polarization direction same as that of the reproduction signal light and focus error signal light, demonstrate a diverging action, increase the combined focal point distance, and produce no action as a diffraction lens on the light with a polarization direction same as that of the gap error signal light.

Embodiment 5

An optical disk drive device of Embodiment 5 of the present invention will be described below with reference to FIG. 11.

Figure 11:
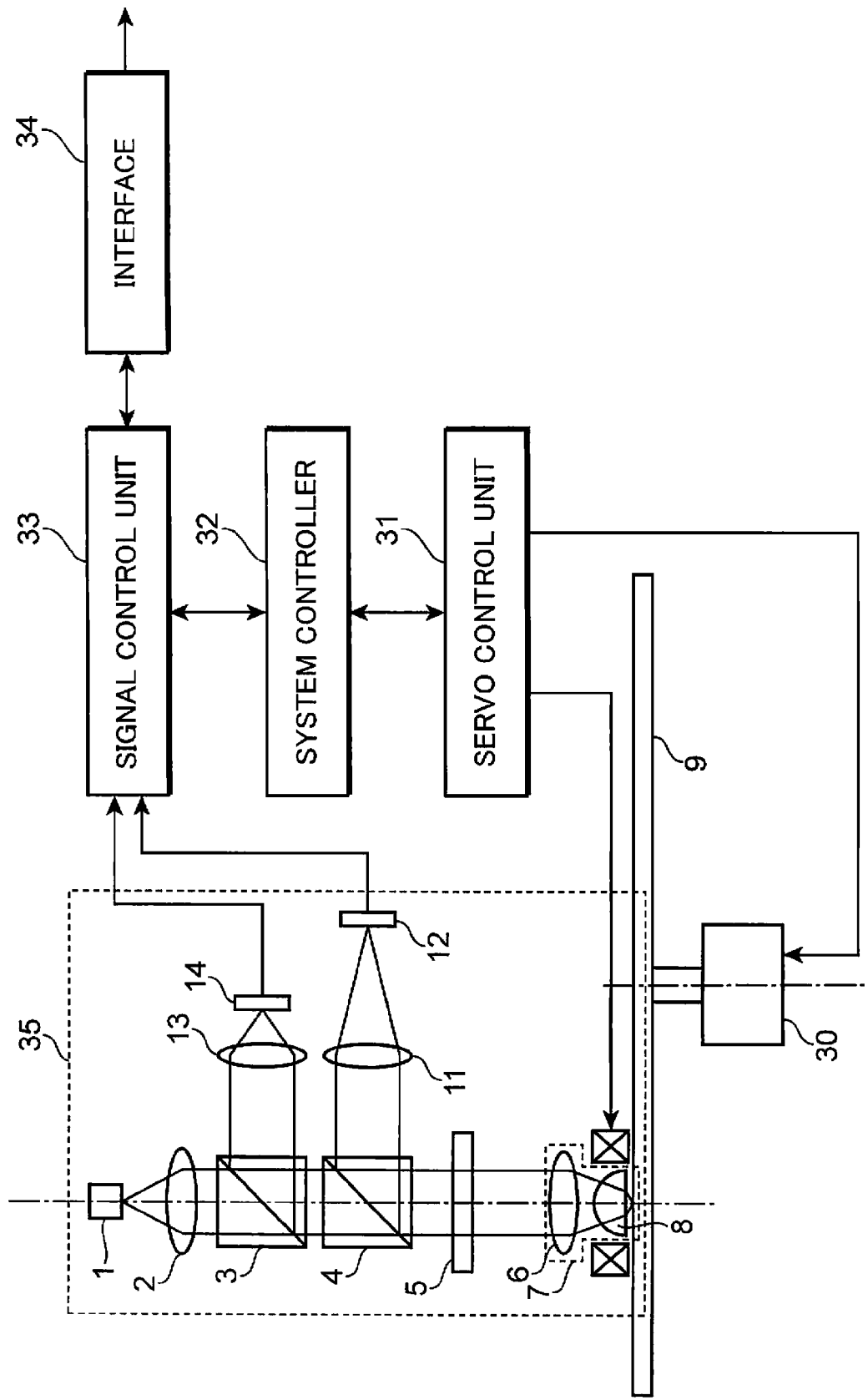
FIG. 11 illustrates the configuration of the optical disk drive device of Embodiment 5 of the present invention.

FIG. 11 illustrates the configuration of the optical disk drive device of Embodiment 5 of the present invention.

As shown in FIG. 11, the optical disk drive device is provided with an optical pickup 35, a spindle motor 30, a head drive unit (not shown in the figure), a signal processing unit 33, an interface 34, a servo control unit 31, a feed motor (not shown in the figure), and a system controller 32.

The spindle motor 30 is controlled by the servo control unit 31 and rotated at a predetermined revolution speed. The laser light from the optical pickup 35 is radiated to the optical information medium 9 rotated by the spindle motor 30.

The optical pickup 35 radiates the laser light to the optical information medium 9 rotated by the spindle motor 30 and reads the information signals from the optical information medium 9 on the basis of the returned light. Further, the optical pickup 35 outputs a gap error signal on the basis of the reflected light from the flat surface portion of the solid immersion lens 8. The optical pickup 35 is the optical pickup of any of Embodiments 1 to 4.

The optical pickup 35 is supported movable in the direction perpendicular to the recording track of the optical information medium 9 and driven in the direction perpendicular to the recording track of the optical information medium 9 by the feed motor (not shown in the figure).

The signal processing unit 33 performs signal processing of various kinds with respect to the signals outputted from the optical pickup 35. More specifically, the signal processing unit 33 is provided with a signal demodulator and an error correction circuit as an information signal reproduction system and also provided with a signal modulator or the like as an information signal recording system. When signals are reproduced by the signal processing unit 33, the reproduction signals that have been read from the optical information medium 9 by the optical pickup 35 are demodulated by the signal demodulator and subjected to error correction by the correction circuit.

The interface 34 performs data exchange with the externally connected electronic device. The externally connected electronic device is, for example, an external computer.

For example, when a reproduction operation is performed in the optical disk drive device, the reproduction signals that have been processed in the signal demodulator and error correction circuit of the signal processing unit 33 are transmitted via the interface 34 to the external computer.

The servo control unit 31 servo controls a lens drive unit such as a biaxial actuator that holds the focusing lens group 7 in the optical pickup 35 and moves the focusing lens group 7 in the focusing direction and tracking direction.

The servo control unit 31 also servo controls the feed motor (not shown in the figure) that feeds the optical pickup 35.

The servo control unit 31 also servo controls the spindle motor 30 that rotationally drives the optical information medium 9. The servo control unit 31 servo controls the above-mentioned units on the basis of control signals from the system controller 32. The system controller 32 controls the units constituting the optical disk drive device.

When the optical disk drive device having the above-described configuration reproduces information from the optical information medium 9, the signal demodulator and correction circuit of the signal processing unit 33 perform demodulation and error correction with respect to the reproduction signals that have been read by the optical pickup 35 from the optical information medium 9 rotated by the spindle motor 30. The reproduction signals subjected to the signal processing are transmitted, for example, via the interface 34 to the externally connected electronic device.

When the optical disk drive device records information on the optical information medium 9, the information signals are modulated by the signal modulator of the signal processing unit 33, and laser light for recording that has a predetermined laser output based on the modulated information signal is radiated from the optical pickup 35 onto the optical information medium 9 rotated by the spindle motor 30.

In Embodiment 5, the optical pickup 35 corresponds to an example of the optical pickup, the spindle motor 30 corresponds to an example of the motor, and the servo control unit 31, system controller 32, and signal processing unit 33 correspond to examples of the control unit. Further, the servo control unit 31, system controller 32, and signal processing unit 33 function as the gap control unit 10 in Embodiments 1 to 4.

In the above-described Embodiments 1 to 5, the optical pickup and optical disk drive device are explained that record or reproduce information on an optical information medium that uses a near field optical recording technique, for example, an optical disk of a phase change type. However, the present invention is not limited to such a configuration and can be also applied to other optical information media such as magnetooptical recording medium.

Embodiment 6

Figure 12:
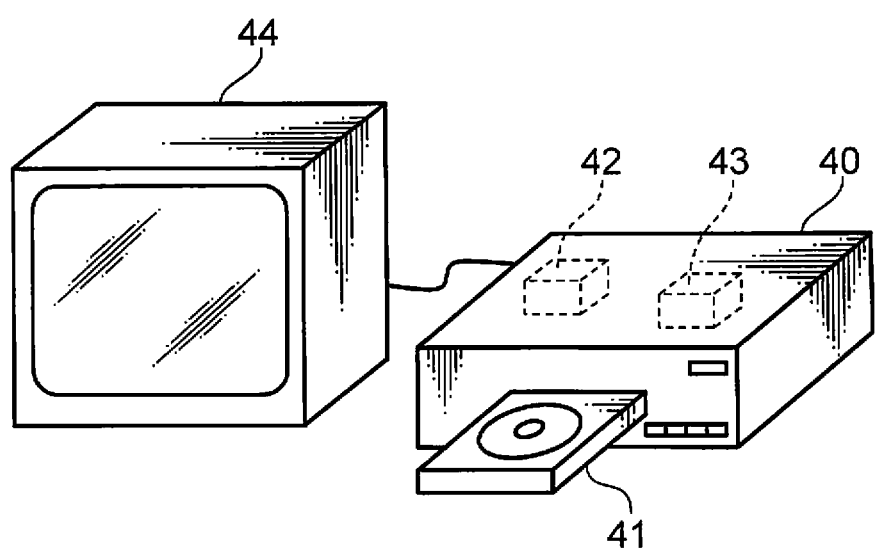
FIG. 12 is a schematic perspective view illustrating the entire configuration of the optical information recording and reproduction device in Embodiment 6 of the present invention.

An optical information recording and reproduction device of Embodiment 6 of the present invention will be explained below with reference to FIG. 12.

Embodiment 6 relates to an optical information recording and reproduction device provided with the optical disk drive device according to Embodiment 5. FIG. 12 is a schematic perspective view illustrating the entire configuration of the optical information recording and reproduction device in Embodiment 6 of the present invention. An optical information recording and reproduction device 40 shown in FIG. 12 is provided with the optical disk drive device 41 according to Embodiment 5, a signal processing circuit for recording (signal processing unit for recording) 42 that converts image information into information signals for recording on an optical information medium with the optical disk drive device 41, and a signal processing circuit for reproduction (signal processing unit for reproduction) 43 that converts the information signals obtained from the optical disk drive device 41 into image information.

In Embodiment 6, the optical information recording and reproduction device 40 is provided with the signal processing circuit 42 for recording and the signal processing circuit 43 for reproduction, but the present invention is not limited to such a configuration, and a configuration may be used that is provided with only either of the signal processing circuit 42 for recording and the signal processing circuit 43 for reproduction. Furthermore, the optical information recording and reproduction device 40 may be also provided with an output device 44 such as a cathode-ray tube or liquid crystal display device that displays information.

In Embodiment 6, the optical information recording and reproduction device 40 corresponds to an example of the optical information recording device and optical information reproduction device, and the signal processing circuit 42 for recording and the signal processing circuit 43 for reproduction correspond to an example of the information processing unit.

The optical information recording and reproduction device 40 according to Embodiment 6 is provided with the optical disk drive device 41 according to Embodiment 5 and can stably record and reproduce information on an optical information medium having a plurality of information recording layers for recording or reproducing information by near-field light. Therefore, such an optical information recording and reproduction device has a wide range of applications.

The above-described specific embodiments mainly include the invention having the below-described features.

The optical pickup according to one aspect of the present invention is an optical pickup for recording/reproducing information on/from an optical information medium having a plurality of information recording layers, including: a light source that emits light in a predetermined polarization state; a focusing lens group that includes a solid immersion lens having a flat surface portion parallel to a surface of the optical information medium and focuses the light; a first focusing unit that focuses reflected light obtained by reflection of the light focused by the focusing lens group from the optical information medium; a first photodetector that detects at least either a reproduction signal or a focus error signal by detecting a light quantity of reflected light from the optical information medium that has been focused by the first focusing unit; a second focusing unit that focuses reflected light obtained by reflection of the light focused by the focusing lens group from the flat surface portion of the solid immersion lens; and a second photodetector that detects a gap error signal corresponding to a distance between the surface of the optical information medium and the flat surface portion of the solid immersion lens by detecting a light quantity of reflected light from the flat surface portion of the solid immersion lens that has been focused by the second focusing unit, wherein an optical magnification ratio M of a first optical system including the focusing lens group and the first focusing unit and an optical magnification ratio m of a second optical system including the focusing lens group and the second focusing unit satisfy the condition M>m.

With such a configuration, the light source emits light with a predetermined polarization state. The focusing lens group includes a solid immersion lens having a flat surface portion parallel to the surface of the optical information medium and focuses the light. The first focusing unit focuses reflected light obtained by reflection of the light focused by the focusing lens group from the optical information medium. The first photodetector detects at least either a reproduction signal or a focus error signal by detecting a light quantity of reflected light from the optical information medium that has been focused by the first focusing unit. The second focusing unit focuses reflected light obtained by reflection of the light focused by the focusing lens group from the flat surface portion of the solid immersion lens. The second photodetector detects a gap error signal corresponding to a distance between the surface of the optical information medium and the flat surface portion of the solid immersion lens by detecting a light quantity of reflected light from the flat surface portion of the solid immersion lens that has been focused by the second focusing unit. The optical magnification ratio M of the first optical system including the focusing lens group and the first focusing unit and the optical magnification ratio m of the second optical system including the focusing lens group and the second focusing unit satisfy the condition M>m.

In accordance with the above, when information is recorded/reproduced on/from a multilayer optical information medium having a plurality of information recording layers, the effect produced by the reflected light from the information recording layers other than the information recording layer that is the object of recording or reproduction on the reproduction signal light and focus error signal light can be inhibited. Furthermore, since the gap error signal can be detected with high accuracy, the reproduction signal, focus error signal, and gap error signal can be detected with high accuracy when information is recorded/reproduced on/from an optical information medium having a plurality of information recording layers.

In the abovementioned optical pickup, it is preferred that the optical magnification ratio M of the first optical system be determined such that when the light is focused on a predetermined information recording layer from among the plurality of information recording layers, a surface area of a spot of reflected light from an information recording layer adjacent to the predetermined information recording layer on the first photodetector is three or more times a surface area of a light receiving surface of the first photodetector.

With such a configuration, the optical magnification ratio M of the first optical system is determined such that when the light is focused on a predetermined information recording layer from among the plurality of information recording layers, the surface area of a light spot of reflected light on the first photodetector from an information recording layer adjacent to the predetermined information recording layer is three or more times the surface area of the light receiving surface of the first photodetector.

Therefore, the effect produced by the reflected light from the information recording layers other than the information recording layer that is the object of recording or reproduction on the reproduction signal light and focus error signal can be inhibited.

In the abovementioned optical pickup, it is preferred that when a numerical aperture of the focusing lens group is equal to or greater than 1.5, the optical magnification ratio M of the first optical system satisfy the condition M≧30.

With such a configuration, when the numerical aperture of the focusing lens group is equal to or greater than 1.5, the optical magnification ratio M of the first optical system satisfies the condition M≧30. In this case, the surface area of stray light becomes four or more times the surface area of the light receiving surface of the first photodetector, the effect produced by the reflected light from the information recording layers other than the information recording layer that is the object of recording or reproduction can be inhibited, good frequency characteristic is obtained, and a stable reproduction signal can be obtained.

In the abovementioned optical pickup, it is preferred that the optical magnification ratio m of the second optical system be determined such that, even when the light is focused on any information recording layer from among the plurality of information recording layers, the surface area of a light spot on the second photodetector is equal to or less than the surface area of the light receiving surface of the second photodetector.

With such a configuration, the size of the light spot on the second photodetector obtained when the light is focused on each information recording layer is less than the size of the light receiving surface of the photodetector. As a result, the reflected light from the flat surface portion of the solid immersion lens is entirely taken in by the second photodetector when the light is focused on each of the information recording layers. Therefore, the gap error signal can be accurately detected.

In the abovementioned optical pickup, it is preferred that when a numerical aperture of the focusing lens group is equal to or less than 2.0, the optical magnification ratio m of the second optical system satisfy the condition m≦10.

With such a configuration, when a numerical aperture of the focusing lens group is equal to or less than 2.0, the optical magnification ratio m of the second optical system satisfies the condition m≦10. In this case, the surface area ratio of the focus spot of the reflected light from the flat surface portion of the solid immersion lens on the second photodetector to the light receiving surface (light receiving element) of the second photodetector is equal to or less than 1, the light spot is prevented at all times from projecting from the light receiving element (light receiving surface) of the second detector 14, a good frequency characteristic is obtained, and a stable gap error signal can be obtained.

Further, it is preferred that the abovementioned optical pickup further include a first optical path splitting unit that is disposed on an optical path of the light emitted from the light source, transmits the light emitted from the light source, and reflects reflected light from the flat surface portion of the solid immersion lens toward the second photodetector; a second optical path splitting unit that is disposed on an optical path of the light transmitted by the first optical path splitting unit, transmits the light transmitted by the first optical path splitting unit, and reflects reflected light from the optical information medium toward the first photodetector; and a quarter-wavelength plate disposed on an optical path of the light transmitted by the second optical path splitting unit, wherein the focusing lens group is disposed on the optical path of the light transmitted by the quarter-wavelength plate; the first focusing unit is disposed on an optical path of reflected light from the optical information medium that has been reflected by the second optical path splitting unit; and the second focusing unit is disposed on an optical path of reflected light from the flat surface portion of the solid immersion lens that has been reflected by the first optical path splitting unit.

With such a configuration, the first optical path splitting unit is disposed on the optical path of the light emitted from the light source, transmits the light emitted from the light source, and reflects reflected light from the flat surface portion of the solid immersion lens toward the second photodetector. The second optical path splitting unit is disposed on the optical path of the light transmitted by the first optical path splitting unit, transmits the light transmitted by the first optical path splitting unit, and reflects reflected light from the optical information medium toward the first photodetector. The quarter-wavelength plate is disposed on the optical path of the light transmitted by the second optical path splitting unit. The focusing lens group is disposed on the optical path of the light transmitted by the quarter-wavelength plate. The first focusing unit is disposed on the optical path of reflected light from the optical information medium that has been reflected by the second optical path splitting unit. The second focusing unit is disposed on the optical path of reflected light from the flat surface portion of the solid immersion lens that has been reflected by the first optical path splitting unit.

Therefore, the optical path of the reflected light from the flat surface portion of the solid immersion lens and the optical path of the reflected light from the optical information medium can be split, and at least one of the gap error signal, reproduction signal, and focus error signal can be detected with high accuracy.

Further, in the abovementioned optical pickup, it is preferred that the second optical path splitting unit reflect light with a polarization component parallel to the light emitted from the light source; and the first optical path splitting unit reflect light with a polarization component orthogonal to the light emitted from the light source.

With such a configuration, the second optical path splitting unit reflects light with a polarization component parallel to the light emitted from the light source, and the first optical path splitting unit reflects light with a polarization component orthogonal to the light emitted from the light source. Therefore, the optical path of the reflected light from the flat surface portion of the solid immersion lens and the optical path of the reflected light from the optical information medium can be split.

Further, it is preferred that the abovementioned optical pickup further include an optical path splitting unit that is disposed on an optical path of the light emitted from the light source, transmits the light emitted from the light source, and reflects mixed light including reflected light from the flat surface portion of the solid immersion lens and reflected light from the optical information medium; and a polarization separation element that is disposed on an optical path of the mixed light reflected by the optical path splitting unit and separates the mixed light reflected by the optical path splitting unit into the reflected light from the flat surface portion of the solid immersion lens and the reflected light from the optical information medium, wherein the focusing lens group is disposed on an optical path of the light transmitted by the optical path splitting unit; the first focusing unit includes a first light focusing lens that focuses the reflected light from the optical information medium that has been separated by the polarization separation element on the first photodetector and focuses the reflected light from the flat surface portion of the solid immersion lens that has been separated by the polarization separation element on the second photodetector; and the second focusing unit includes the first light focusing lens and a second light focusing lens that further focuses the reflected light from the flat surface portion of the solid immersion lens that has been focused by the first light focusing lens on the second photodetector.

With such a configuration, the optical path splitting unit is disposed on the optical path of the light emitted from the light source, transmits the light emitted from the light source, and reflects mixed light including reflected light from the flat surface portion of the solid immersion lens and reflected light from the optical information medium. The polarization separation element is disposed on the optical path of the mixed light reflected by the optical path splitting unit and separates the mixed light reflected by the optical path splitting unit into reflected light from the flat surface portion of the solid immersion lens and reflected light from the optical information medium. The focusing lens group is disposed on the optical path of the light transmitted by the optical path splitting unit. The first focusing unit includes the first light focusing lens that focuses the reflected light from the optical information medium that has been separated by the polarization separation element on the first photodetector and focuses the reflected light from the flat surface portion of the solid immersion lens that has been separated by the polarization separation element on the second photodetector. The second focusing unit includes the first light focusing lens and the second light focusing lens that further focuses the reflected light from the flat surface portion of the solid immersion lens that has been focused by the first light focusing lens on the second photodetector.

Therefore, since the mixed light reflected by the optical path splitting unit is separated by the polarization separation element into the reflected light from the flat surface portion of the solid immersion lens and the reflected light from the optical information medium, the number of optical components can be reduced, the configuration of the optical system can be reduced in size, and the optical pickup can be reduced in cost.

Further, it is preferred that the abovementioned optical pickup further include an optical path splitting unit that is disposed on an optical path of the light emitted from the light source, transmits the light emitted from the light source, and reflects mixed light including reflected light from the flat surface portion of the solid immersion lens and reflected light from the optical information medium; and a polarization separation element that is disposed on an optical path of the mixed light reflected by the optical path splitting unit and separates the mixed light reflected by the optical path splitting unit into the reflected light from the flat surface portion of the solid immersion lens and the reflected light from the optical information medium, wherein the focusing lens group is disposed on an optical path of the light transmitted by the optical path splitting unit; the first focusing unit includes a third light focusing lens that focuses reflected light from the optical information medium that has been separated by the polarization separation element on the first photodetector and focuses reflected light from the flat surface portion of the solid immersion lens that has been separated by the polarization separation element on the second photodetector and a fourth light focusing lens that further focuses or diverges reflected light from the optical information medium that has been focused by the third light focusing lens on the first photodetector; and the second focusing unit includes the third light focusing lens.

With such a configuration, the optical path splitting unit is disposed on the optical path of the light emitted from the light source, transmits the light emitted from the light source, and reflects the mixed light including reflected light from the flat surface portion of the solid immersion lens and reflected light from the optical information medium. The polarization separation element is disposed on the optical path of the mixed light reflected by the optical path splitting unit and separates the mixed light reflected by the optical path splitting unit into reflected light from the flat surface portion of the solid immersion lens and reflected light from the optical information medium. The focusing lens group is disposed on the optical path of the light transmitted by the optical path splitting unit. The first focusing unit includes a third light focusing lens that focuses the reflected light from the optical information medium that has been separated by the polarization separation element on the first photodetector and focuses the reflected light from the flat surface portion of the solid immersion lens that has been separated by the polarization separation element on the second photodetector and the fourth light focusing lens that further focuses or diverges the reflected light from the optical information medium that has been focused by the third light focusing lens on the first photodetector. The second focusing unit includes the third light focusing lens.

Therefore, since the mixed light reflected by the optical path splitting unit is separated by the polarization separation element into the reflected light from the flat surface portion of the solid immersion lens and the reflected light from the optical information medium, the number of optical components can be reduced, the configuration of the optical system can be reduced in size, and the optical pickup can be reduced in cost.

In the abovementioned optical pickup, it is preferred that the polarization separation element include either a Wollaston prism or a polarization hologram.

With such a configuration, the reflected light from the flat surface portion of the solid immersion lens and the reflected light from the optical information medium can be separated.

In the abovementioned optical pickup, it is preferred that the optical path splitting unit include a beam splitter.

With such a configuration, the light emitted from the light source can be transmitted and the mixed light including the reflected light from the flat surface portion of the solid immersion lens and the reflected light from the optical information medium can be reflected by the beam splitter.

An optical disk drive device according to another aspect of the present invention includes any of the abovementioned optical pickups; a motor that rotates an optical information medium; and a control unit that controls the motor and the optical pickup on the basis of an electric signal obtained from the optical pickup. With such a configuration, the abovementioned optical pickups can be used in an optical disk drive device.

An optical information recording device according to another aspect of the present invention includes the abovementioned optical disk drive device; and an information processing unit that processes information for recording on an optical information medium by the optical disk drive device. With such a configuration, the optical disk drive device provided with the abovementioned optical pickup can be used in an optical information recording device.

An optical information reproduction device according to another aspect of the present invention includes the abovementioned optical disk drive device; and an information processing unit that processes information reproduced from an optical information medium by the optical disk drive device. With such a configuration, the optical disk drive device provided with the abovementioned optical pickup can be used in an optical information reproduction device Specific embodiments or examples implemented in the description of the embodiments of the invention only clarify technical contents of the present invention, the present invention should not be interpreted narrowly as being limited to such specific examples, and variations can be effected within the spirit of the present invention and the scope of the following claims.

Industrial Applicability

The optical pickup in accordance with the present invention can be applied to optical pickups of a near-field optical recording and reproduction systems that use a solid immersion lens for recording/reproducing information on/from an optical information medium which has a plurality of information recording layers and on which large volumes, for example, several hundred gigabytes or more, of digital information can be recorded.

The invention claimed is:

1. An optical pickup for recording/reproducing information on/from an optical information medium having a plurality of information recording layers, comprising:
   a light source that emits light in a predetermined polarization state;
   a focusing lens group that includes a solid immersion lens having a flat surface portion parallel to a surface of the optical information medium and focuses the light;
   a first focusing unit that focuses reflected light obtained by reflection of the light focused by the focusing lens group from the optical information medium;
   a first photodetector that detects at least either a reproduction signal or a focus error signal by detecting a light quantity of reflected light from the optical information medium that has been focused by the first focusing unit;
   a second focusing unit that focuses reflected light obtained by reflection of the light focused by the focusing lens group from the flat surface portion of the solid immersion lens; and
   a second photodetector that detects a gap error signal corresponding to a distance between the surface of the optical information medium and the flat surface portion of the solid immersion lens by detecting a light quantity of reflected light from the flat surface portion of the solid immersion lens that has been focused by the second focusing unit, wherein
   an optical magnification ratio M of a first optical system including the focusing lens group and the first focusing unit and an optical magnification ratio m of a second optical system including the focusing lens group and the second focusing unit satisfy the condition M>m.

2. The optical pickup according to claim 1, wherein the optical magnification ratio M of the first optical system is determined such that when the light is focused on a predetermined information recording layer from among the plurality of information recording layers, a surface area of a light spot of reflected light on the first photodetector from an information recording layer adjacent to the predetermined information recording layer is three or more times a surface area of a light receiving surface of the first photodetector.

3. The optical pickup according to claim 1, wherein when a numerical aperture of the focusing lens group is equal to or greater than 1.5, the optical magnification ratio M of the first optical system satisfies the condition $M \geq 30$.

4. The optical pickup according to claim 1, wherein the optical magnification ratio m of the second optical system is determined such that, even when the light is focused on any information recording layer from among the plurality of information recording layers, a surface area of a light spot on the second photodetector is equal to or less than a surface area of a light receiving surface of the second photodetector.

5. The optical pickup according to claim 1, wherein when the numerical aperture of the focusing lens group is equal to or less than 2.0, the optical magnification ratio m of the second optical system satisfies the condition $m \leq 10$.

6. The optical pickup according to claim 1, further comprising:
   a first optical path splitting unit that is disposed on an optical path of the light emitted from the light source, transmits the light emitted from the light source, and reflects reflected light from the flat surface portion of the solid immersion lens toward the second photodetector;
   a second optical path splitting unit that is disposed on an optical path of the light transmitted by the first optical path splitting unit, transmits the light transmitted by the first optical path splitting unit, and reflects reflected light from the optical information medium toward the first photodetector; and
   a quarter-wavelength plate disposed on the optical path of the light transmitted by the second optical path splitting unit, wherein the focusing lens group is disposed on the optical path of the light transmitted by the quarter-wavelength plate;
   the first focusing unit is disposed on an optical path of reflected light from the optical information medium that has been reflected by the second optical path splitting unit; and
   the second focusing unit is disposed on an optical path of reflected light from the flat surface portion of the solid immersion lens that has been reflected by the first optical path splitting unit.

7. The optical pickup according to claim 6, wherein
   the second optical path splitting unit reflects light with a polarization component parallel to the light emitted from the light source; and
   the first optical path splitting unit reflects light with a polarization component orthogonal to the light emitted from the light source.

8. The optical pickup according to claim 1, further comprising:
   an optical path splitting unit that is disposed on an optical path of light emitted from the light source, transmits the light emitted from the light source, and reflects mixed light including reflected light from the flat surface portion of the solid immersion lens and reflected light from the optical information medium; and a polarization separation element that is disposed on an optical path of the mixed light reflected by the optical path splitting unit and separates the mixed light reflected by the optical path splitting unit into the reflected light from the flat surface portion of the solid immersion lens and the reflected light from the optical information medium, wherein the focusing lens group is disposed on an optical path of the light transmitted by the optical path splitting unit;

the first focusing unit includes a first light focusing lens that focuses the reflected light from the optical information medium that has been separated by the polarization separation element on the first photodetector and focuses the reflected light from the flat surface portion of the solid immersion lens that has been separated by the polarization separation element on the second photodetector; and the second focusing unit includes the first light focusing lens and a second light focusing lens that further focuses the reflected light from the flat surface portion of the solid immersion lens that has been focused by the first light focusing lens on the second photodetector.

9. The optical pickup according to claim 1, further comprising:

an optical path splitting unit that is disposed on an optical path of the light emitted from the light source, transmits the light emitted from the light source, and reflects mixed light including reflected light from the flat surface portion of the solid immersion lens and reflected light from the optical information medium; and a polarization separation element that is disposed on an optical path of the mixed light reflected by the optical path splitting unit and separates the mixed light reflected by the optical path splitting unit into the reflected light from the flat surface portion of the solid immersion lens and the reflected light from the optical information medium, wherein the focusing lens group is disposed on an optical path of the light transmitted by the optical path splitting unit;

the first focusing unit includes a third light focusing lens that focuses reflected light from the optical information medium that has been separated by the polarization separation element on the first photodetector and focuses reflected light from the flat surface portion of the solid immersion lens that has been separated by the polarization separation element on the second photodetector and a fourth light focusing lens that further focuses or diverges reflected light from the optical information medium that has been focused by the third light focusing lens on the first photodetector; and the second focusing unit includes the third light focusing lens.

10. The optical pickup according to claim 8, wherein the polarization separation element includes either a Wollaston prism or a polarization hologram.

11. The optical pickup according to claim 8, wherein the optical path splitting unit includes a beam splitter.

12. An optical disk drive device comprising:

the optical pickup according to claim 1;

a motor that rotates an optical information medium; and a control unit that controls the motor and the optical pickup on the basis of an electric signal obtained from the optical pickup.

13. An optical information recording device comprising:

the optical disk drive device according to claim 12; and an information processing unit that processes information for recording on an optical information medium by the optical disk drive device.

14. An optical information reproduction device comprising:

the optical disk drive device according to claim 12; and an information processing unit that processes information reproduced from an optical information medium by the optical disk drive device.

* * * * *